(12) United States Patent
Marwinski

(10) Patent No.: US 7,823,143 B2
(45) Date of Patent: Oct. 26, 2010

(54) EFFICIENT ALGORITHM FOR PERFORMING MULTI-PARENT CLASS LOADING

(75) Inventor: Dirk Marwinski, Heidelberg (DE)

(73) Assignee: SAP AG, Walldorf (DE)

( * ) Notice: Subject to any disclaimer, the term of this patent is extended or adjusted under 35 U.S.C. 154(b) by 1178 days.

(21) Appl. No.: 11/118,685

(22) Filed: Apr. 29, 2005

(65) Prior Publication Data

US 2007/0006203 A1 Jan. 4, 2007

(51) Int. Cl.
G06F 9/44 (2006.01)
(52) U.S. Cl. .................. 717/166; 717/165; 717/164
(58) Field of Classification Search .................. 717/166
See application file for complete search history.

(56) References Cited

U.S. PATENT DOCUMENTS

| | | | |
|---|---|---|---|
| 6,513,158 B1 * | 1/2003 | Yogaratnam | 717/166 |
| 6,701,334 B1 * | 3/2004 | Ye et al. | 707/206 |
| 6,748,396 B2 * | 6/2004 | Klicnik et al. | 707/103 Y |
| 6,901,589 B2 * | 5/2005 | White | 717/166 |
| 6,918,106 B1 * | 7/2005 | Burridge et al. | 717/100 |
| 2003/0121031 A1 * | 6/2003 | Fraenkel et al. | 717/166 |
| 2003/0200350 A1 * | 10/2003 | Kumar et al. | 709/315 |
| 2004/0019887 A1 * | 1/2004 | Taylor et al. | 717/166 |

OTHER PUBLICATIONS

"Sun's Java 2 Platform SE v1.3.1:Class ClassLoader", Sun Microsystems Inc , 2001, p. 1.*

* cited by examiner

Primary Examiner—Lewis A Bullock, Jr.
Assistant Examiner—Hang Pan
(74) Attorney, Agent, or Firm—Schwegman, Lundberg & Woessner, P.A.

(57) ABSTRACT

A system and method are described for performing efficient multi-parent class loading. In one embodiment, a request is received at an initiating class loader. A set of class loaders capable of loading the class is narrowed to a set of candidate class loaders. The narrowing of the set of class loaders is performed based on a previously built data structure. A parent class loader from a previously built array of class loaders is used to load the class if the parent class loader is an element of the set of candidate class loaders.

11 Claims, 20 Drawing Sheets

EFFICIENT ALGORITHM FOR PERFORMING MULTI-PARENT CLASS LOADING

TECHNICAL FIELD

Embodiments of the present invention relate to class loading, and more particularly, one embodiment relates to a method for efficiently performing multi-parent class loading to enable the construction and management of large application servers.

BACKGROUND

Traditional client-server systems employ a two-tiered architecture such as that illustrated in FIG. 1A. Applications 102 executed on the client-side 100 of the two-tiered architecture are comprised of a monolithic set of program code including a graphical user interface (GUI) component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1A become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1B. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1B may be implemented using a variety of different application technologies at each of the layers of the multi-tier architecture, including those based on the Java 2 Platform, Enterprise Edition™ (J2EE) standard, the Microsoft®.NET™ standard and/or the Advanced Business Application Programming™ (ABAP) standard developed by SAP AG.

For example, in a J2EE environment, such as the one illustrated in FIG. 1C, the business layer 122 is to handle the core business logic of the application having Enterprise Java-Bean™ (EJB or enterprise bean) components with support for EJB containers 134. While the presentation layer 121 is responsible for generating servlets and Java ServerPages™ (JSP or JSP pages) interpretable with support for Web containers 132 by different types of browsers at the client 125 via a web server 136 a network 103 (e.g., Internet or intranet).

In recent years, as business application development projects have grown larger and more diversified, integration of business applications in terms of people, information, and processes is becoming increasingly important. SAP® NetWeaver™ was developed and presented by SAP AG with core capabilities to provide a solution for the integration of people, information, and processes.

However, the integration of people, information, and processes is resulting in an ever increasing demand for high-level planning, maintenance, and administration, which in turn, requires the underline architecture and environment to conform to, for example, platform independence, inter-process communication, increased security, development versioning, multi-user possibility, and shared memory. For example, it would be useful to have an architectural environment that provides increased robustness, improved integration, better monitoring, reduced memory footprint, decreased internal threads, faster session failover, and shared memory.

In contrast to existing native binary applications, which are usually loaded into the system memory before executing the application, the Java programming language provides another concept of loading application code. Java classes which contain the executable program code are loaded on demand by class loaders. This means that a class is only loaded when it is used for the first time. This enables lazy initialization, which means that certain parts of the application which are not used will not be loaded and do not consume memory resources. This also allows certain parts of an application to be unloaded if they are not used anymore.

SUMMARY

A system and method are described for performing efficient multi-parent class loading. In one embodiment, a request for loading a class is received at a class loader (such as the initiating class loader). The receiving class loader queries its parent class loaders to facilitate loading of the class before attempting to load the class by itself. Instead of searching the entire tree of transitively reachable parent class loaders one by one, a set of candidate class loaders are identified that are capable of loading the class. The identified candidate class loaders are then requested to load the class if they are reachable in the transitive hull of parent class loaders. If the identified candidate class loaders were not capable of loading the class, the receiving class loader attempts to load the class by itself.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1A:
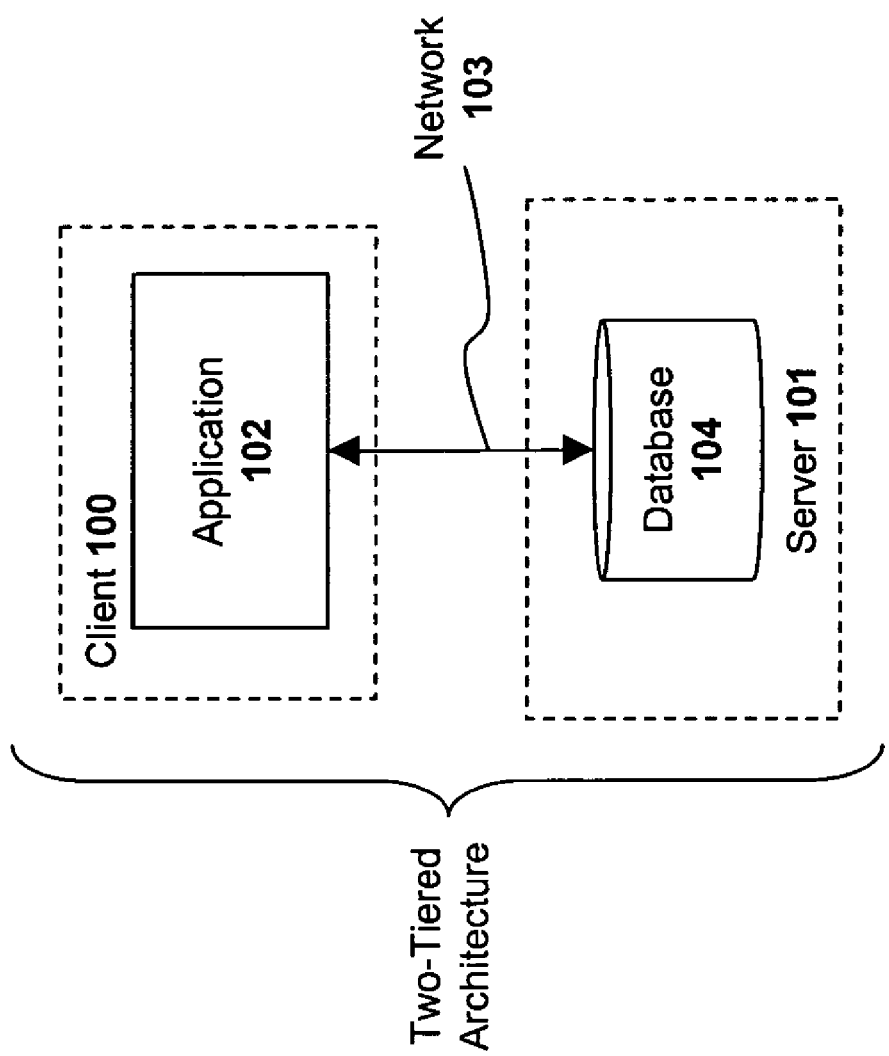
FIG. 1A is a block diagram illustrating a prior art two-tier client-server architecture.
Figure 1B:
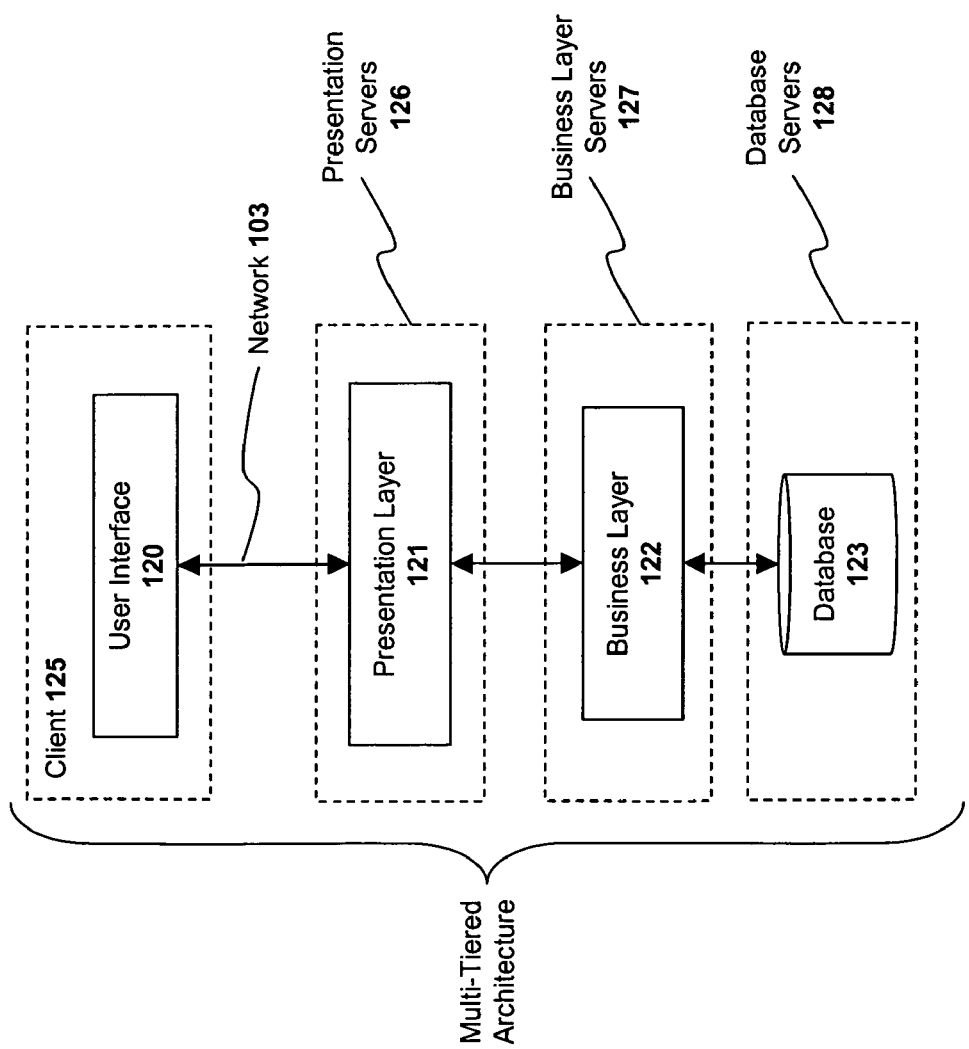
FIG. 1B is a block diagram illustrating a prior art multi-tier client-server architecture.
Figure 1C:
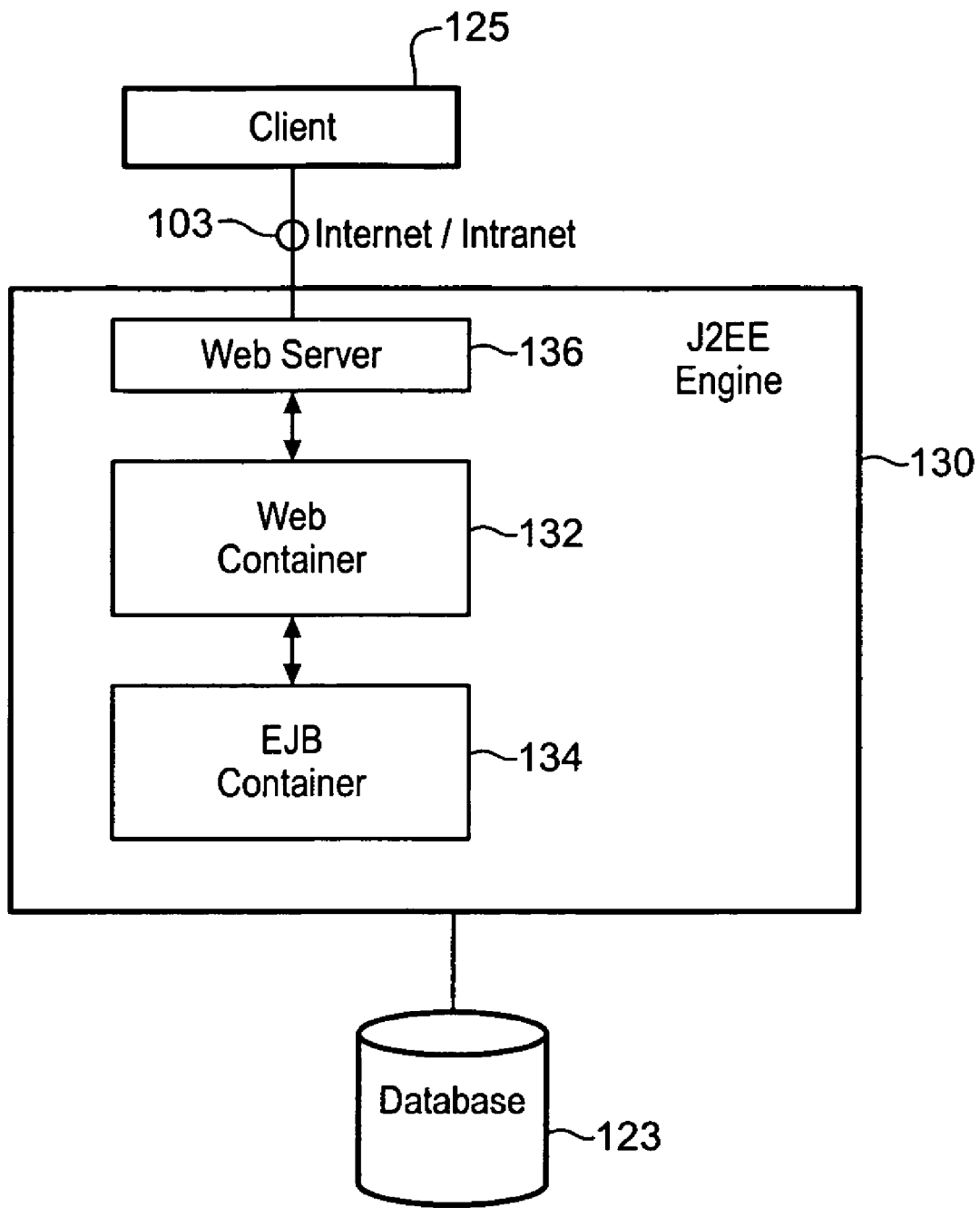
FIG. 1C is a block diagram illustrating a prior art J2EE environment.

Described below is a system and method for employing performing multi-parent class loading. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
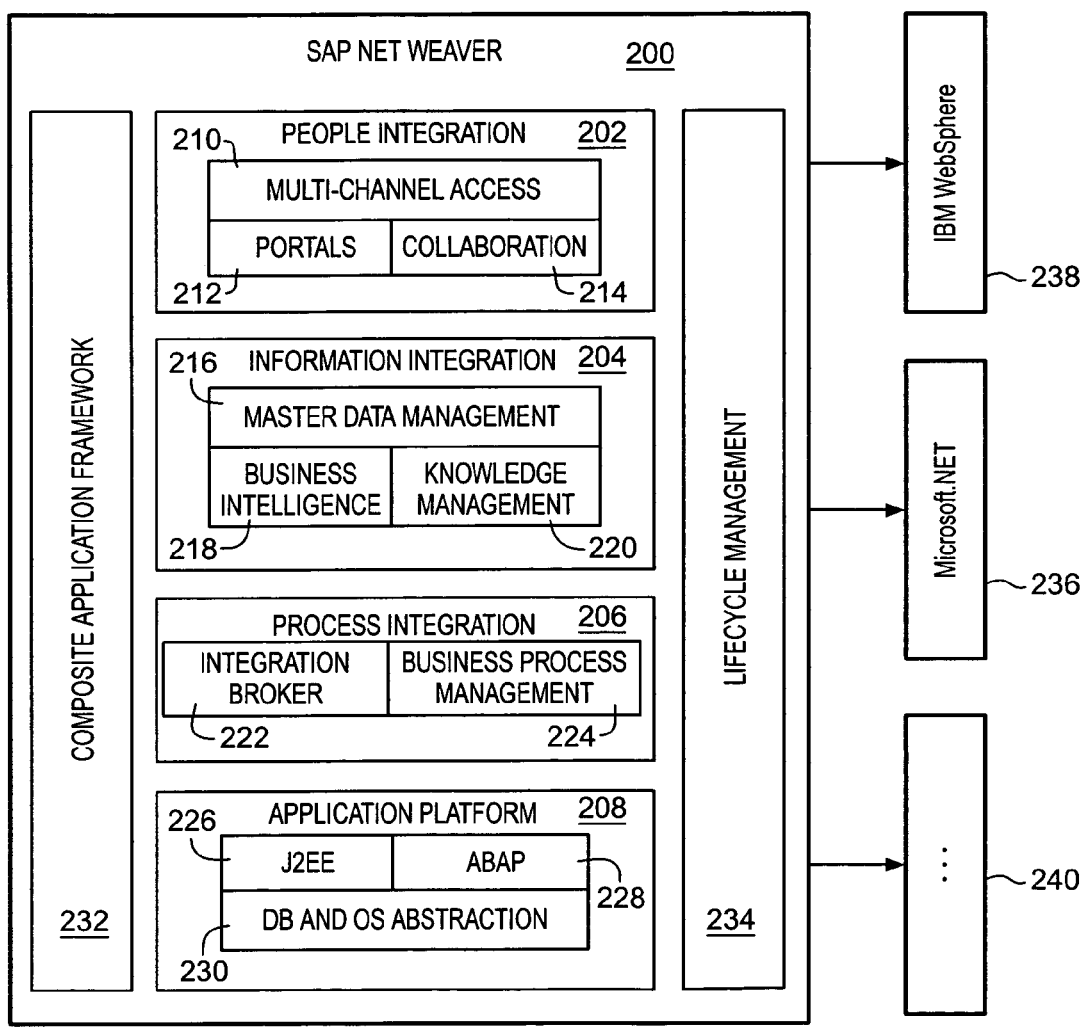
FIG. 2 is a block diagram illustrating an embodiment of the core components of SAP NetWeaver architecture.

FIG. 2 is a block diagram illustrating an embodiment of the core components of SAP NetWeaver architecture 200. As illustrated, the architecture 200 comprises various SAP platforms that are merged together to provide the integration of people, information, and processes in one solution. From an organizational point of view, the architecture 200 includes the following four core areas: people integration 202, information integration 204, process integration 206, and application platform 208. People integration 202 is performed using a portal solution 212 and a platform to work in collaboration 214. Users are provided a multi-channel access 210 to ensure mobility. Examples of the portal solution 212 include SAP Enterprise Portal, SAP Mobile Engine, and Collaboration Package for SAP Enterprise Portal.

Information integration 204 refers to converting information into knowledge quickly and efficiently. Information integration 204 provides efficient business intelligence 216 and knowledge management 220 using SAP products like Business Information Warehouse (BW) and Knowledge Management (KM). Further, consolidation of master data management 218 beyond system boundaries is performed using SAP's Master Data Management (MDM). Process integration 206 refers to optimized process management using integration broker or SAP exchange infrastructure 222 and business process management 224 techniques. Examples of products to perform process integration 206 include Exchange Infrastructure (XI) and Business Process Management (BPM).

Application platform 208 refers to SAP's Web Application Server (Web AS), which is the basis for SAP applications. Web AS, which may be independent of the database and operating system 230, includes a J2EE engine 226 in combination with an already present ABAP engine or instance 228 to further enhance the application platform 208. The architecture 200 further includes a composite application framework 232 to provide various open interfaces (APIs) and a lifecycle management 234, which is an extension of the previous Transport Management System (TMS). As illustrated, the architecture 200 further provides communication with Microsoft .NET 236, International Business Machine® (IBM) WebSphere™ 238, and the like 240.

Figure 3:
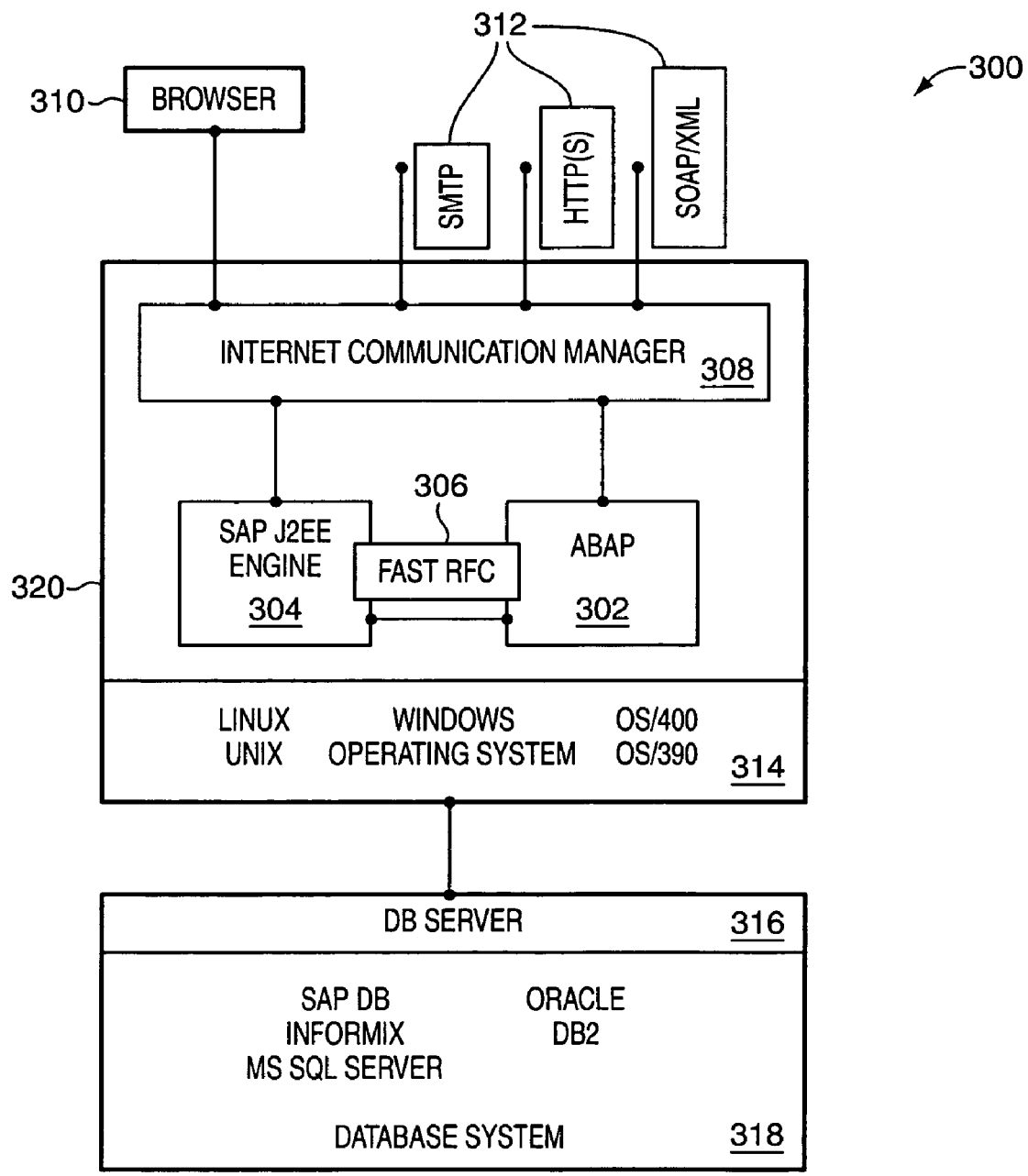
FIG. 3 is a block diagram illustrating an embodiment of an architecture having a Web Application Server.

FIG. 3 is a block diagram illustrating an embodiment of an architecture 300 having a Web Application Server 320. The architecture 300 serves as an application platform (e.g., application platform 208 of FIG. 2) for SAP NetWeaver and other SAP products. As illustrated, the architecture 300 includes a Web AS 320 having an ABAP engine 302, which provides the ABAP development and runtime environment, with the dependability, scalability, and inter-process independence of operating systems 314 and database systems 318. The operating system 314 includes LINUX, UNIX, Windows, OS/390, OS/400, and the like. The database system 318 includes SAP database (e.g., MAX DB), Informix, Oracle, DB2, and the like.

The Web AS 320 having the ABAP engine 302 is further enhanced by including a J2EE engine 304. The J2EE engine 304 is in communication with the ABAP engine 302 via a fast Remote Function Call (RFC) connection 306. The two engines 302-304 are further in communication with an Internet Communication Manger (ICM) 308. The ICM 308 is provided for handling and distributing queries (e.g., Internet queries) to various individual components of the architecture 300. The architecture 300 further supports a browser 310, such as Microsoft Internet Explorer, Netscape Navigator, and other modified variations of mobile end devices, such as personal digital assistants (PDAs), pocket computers, smart cell phones, other hybrid devices, and the like. The Web AS 320 also supports various protocols and standards 312, such as HyperText Markup Language (HTML), eXtensible Markup Language (XML), Wireless Markup Language (WML), HyperText Transport Protocol (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like.

Figure 4:
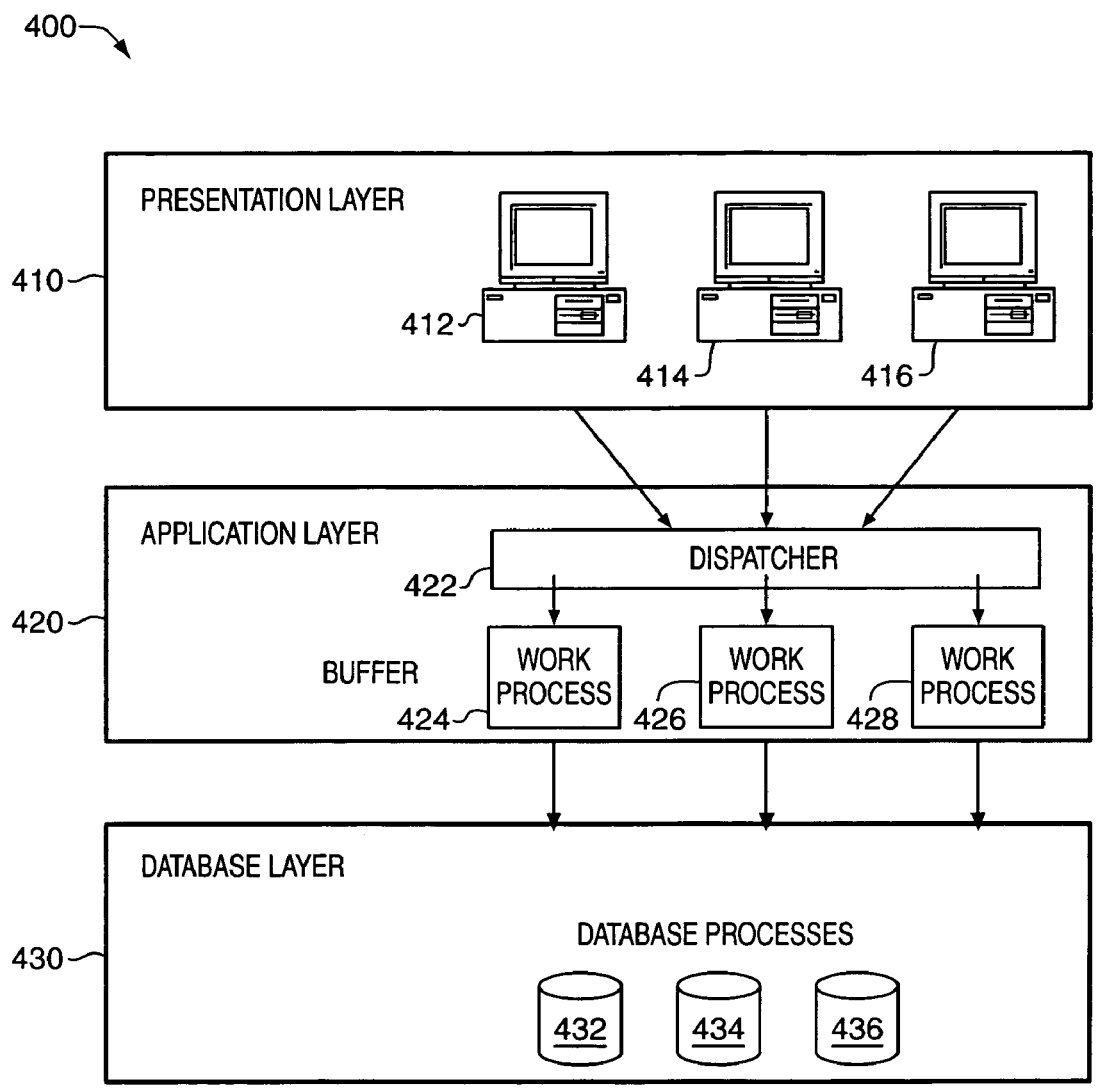
FIG. 4 is a block diagram illustrating an embodiment of a Web Application Server-based architecture having multiple layers.

FIG. 4 is a block diagram illustrating an embodiment of a Web Application Server-based architecture 400 having multiple layers 410, 420, 430. As illustrated, the three layers or levels 410, 420, 430 include a presentation layer (or distributed services or manager or user or client layer) 410, an application agent layer (or agent layer) 420, and a database layer (or instrumentation layer) 430. Various components and elements at each of layer 410, 420, 430 of the architecture 400 are, directly or indirectly, interconnected via a network (e.g., a Local Area Network (LAN)). Alternative embodiments of the architecture 400 may include more or fewer layers.

The presentation layer 410 serves as an interface between various applications and users or clients 412-416. Here, the clients are illustrated as workstations or terminals 412-416 that are used to collect and gather user input and send it to the application layer 420 via a network connection. The network connection may be a wired or wireless connection to a LAN, a Wide Area Network (WAN), a Metropolitan Area Network (MAN), an intranet, and/or the Internet. The terminals 412-416 include personal computers, notebook computers, personal digital assistants, telephones, and the like. In one embodiment in which the network connection connects to the Internet, one or more of the user terminals 412-416 may include a Web browser (e.g., Internet Explorer or Netscape Navigator) to interface with the Internet.

The presentation layer 410 allows the end user to interact with the relevant application using a GUI, such as the SAP GUI, which is a universal client widely used for accessing SAP R/3 or mySAP functions. The GUI works as a browser and offers east access to various SAP functions, such as application transactions, reports, and system administration functions. The SAP GUI, for example, is available in three different formats, each of which having its own unique selling point and is suited to a particular user. The three formats include SAP GUI for Windows®, SAP GUI for HTML, and SAP GUI for Java™.

The presentation layer 410 may also include various management applications, such as a Java Management Extension (JMX)-compliant management application, a JMX manager, and/or a proprietary management application. The management applications include one or more graphical management applications, such as a visual administrator, operating to, for example, retrieve and display information received from the application layer 420 and/or the database layer 430. The visual administrator includes a monitor viewer to display such and other information. The monitor viewer includes a GUI-based or Web-based monitor viewer. Management applications include third party tools, such as file systems, to store information.

The application layer 420 includes various application servers and computing devices to perform data processing. The application layer 420 includes a dispatcher 418, which refers to the central process on the application layer 420 for processing transactions. For example, the dispatcher 422 is used to distribute the request load to individual work processes 424-428, organize communication between the work processes 424-428, and establish connection to the presentation layer 410. For example, when a user makes processing entries from his computer using the menu on the presentation layer 410, the entries are converted into a special format (e.g., GUI protocol) and forwarded to the dispatcher 422. The dispatcher 422 then places this request in a dispatcher queue. The queue is then used to free work processes 424-428 that carry out the processing. The application layer 420 may be implemented in accordance with J2EE v1.3, final release Sep. 24, 2001, published on Jul. 18, 2002 (the J2EE Standard). An update of J2EE v1.3 was recently released, on Nov. 24, 2003, as J2EE v1.4. The management techniques described herein are used to manage resources within a "cluster" of server nodes. However, the underlying principles of the invention are not limited to any particular application server architecture.

The database layer 430 is used to optimize the data access without the being dependent on the underlying database and the operating system. The database independence is achieved using open standards, such as Java Database Connectivity (JDBC). The presentation layer 410 is where the user interacts with the relevant application, which is then executed at the application layer 420, while the data processing 432-436 is managed at the database layer 430. The database layer 430 may include one or more database management systems (DBMS) and data sources. Furthermore, the database layer 430 is compatible with both the ABAP and J2EE environments and allows the two environments to communicate with each other. For example, the functions of ABAP (e.g., Open SQL for ABAP) are transferred to the functions of J2EE (e.g., Open SQL for Java) using a variety of APIs.

The database layer 430 may include one or more database servers, EJB servers, old systems, and mySAP components. The clients at the presentation layer 410 may access one or more of the applications via standalone Java programs and programs that help access an application via, for example, using Internet Inter-Object Request Broker Protocol (IIOP)/Common Object Request Broker Architecture (COBRA) written using any number of programming languages (e.g., C, C++, C#, and Java).

The J2EE environment may also include various J2EE containers that are associated with various J2EE services and APIs, which include Java Naming and Directory Interface (JNDI), Java Database Connectivity (JDBC), J2EE connector Architecture (JCA), Remote Method Invocation (RMI), Java Transaction API (JTA), Java Transaction Service (JTS), Java Message Service (JMS), Java Mail, Java Cryptography Architecture (JCA), Java Cryptography Extension (JCE), Java Authentication and Authorization Service (JAAS), Enterprise Java Beans (EJB), Java Server Pages (JSP), and Java Servlet Technology (JST).

Figure 5A:
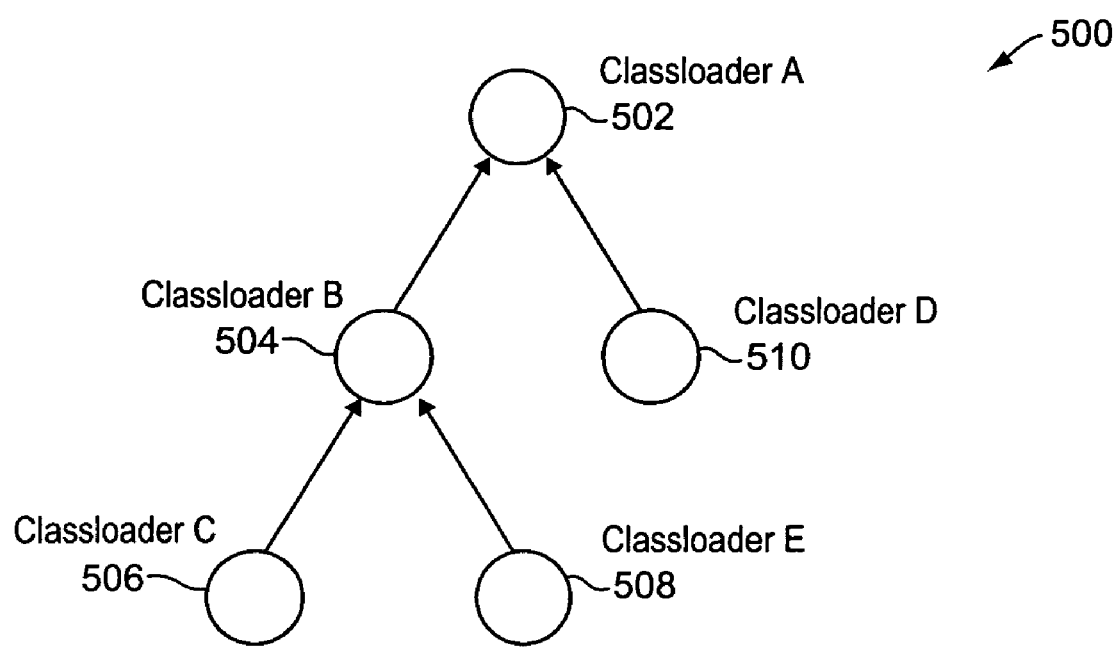
FIG. 5A-5E are block diagrams illustrating a conventional class loading model.

FIGS. 5A-5E are block diagrams illustrating a conventional class loading model (model) 500. FIG. 5A illustrates a conventional class loading model 500 being organized in a tree-like structure having a number of class loaders 502-510. Using this conventional tree-like class loading model 500, each class loader 502-510 has a single parent class loader to delegate class loading requests. For example, starting at the bottom, class loaders C and E 506-508 have parent class loader B 504 to request to perform class loading. Class loader A 502 is the parent class loader of class loaders B and D 504, 510 and is asked to perform class loading requests for class loaders B and D 504, 510. Stated differently, for example, class loader A 502 is classified as the root class loader, while class loader B 504 is a child class loader of the parent class loader A 502, while class loader B 504 is the parent class loader of class loader C 506. Since each class loader 502-510 cannot have more than a single parent, class loading using the conventional class loading model 500 becomes difficult and cumbersome particularly, when loading large applications with numerous components running at an application server.

Each class loader 502-510 (and classes loaded by this class loader) can see and use the classes loaded by parent class loaders, such as a class loaded by class loader C 506 can see classes loaded by class loaders B and A 504, 502. Class loader 502-510 (and classes loaded by these class loaders) cannot see and use classes loaded by class loaders that are not either direct parents or parents of their parents. For example, classes loaded by class loader C 506 cannot see or directly access classes loaded by class loader E 508. This mechanism is used to shield software components from each other. It is contemplated that it is the classes which form software components are loaded by class loaders 502-510.

In addition to simply loading classes, class loaders 502-510 can also be used for redeploying software components while other software components keep running. This is usually done when there is a new version of a particular software component. For example, the software component loaded by class loader C 506. Redeploying the component means that the component needs to be stopped to release its resources. Then, class loader C 506 is to be removed from the system and a new class loader C' is created which loads the classes of the updated software component. Stopping a class loader means removing all references to the class loader itself, removing all references to class files loaded by the class loader, and removing all references to objects which are instances of the classes. The class loader including the classes loaded by it and objects that are instances of these classes are then garbage collected by the system. Other software components loaded by other class loaders 502-504 and 508-510 are not affected.

Figure 5B:
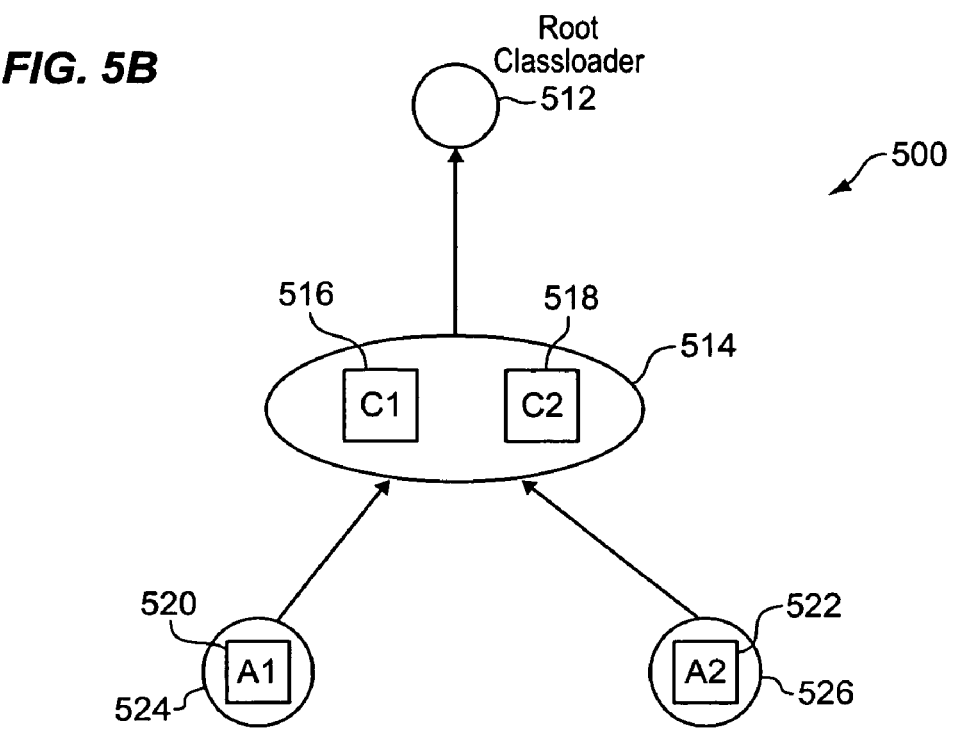

Referring now to FIG. 5B, which includes two components C1 and C2 516-518 that do not depend on each other are loaded by a common class loader 514. The model 500 further includes two applications A1 and A2 520 and 522 loaded by class loaders 524 and 526, respectively. Application A1 520 depends on both components C1 and C2 516-518, however; Application A2 522 depends on a single component C1 516. Using the conventional single parent model 500, it is not possible to map these requirements to a clean class loader hierarchy. The two conventional possibilities to map these requirements are shown in FIGS. 5B and 5C, both having drawbacks that are problematic to the application domain.

One conventional way to resolve the application dependency problem is to combine the two components C1 and C1 516-518 into a single class loader 514, as illustrated in FIG. 5B. However, this solution has several disadvantages. For example, component C1 516 identifies and sees component C2 518 and its classes and vice versa, which can lead to problems, such as mixing classes with identical names in both components. Also, application A2 522 sees component C2 518 and its classes, even though it does not depend on it, which also creates problems with mixing of identical class names. Further, if component C2 518 is to be redeployed, everything, including component C1 516, and applications A1 and A2 520, 526, would have to be stopped.

Figure 5C:
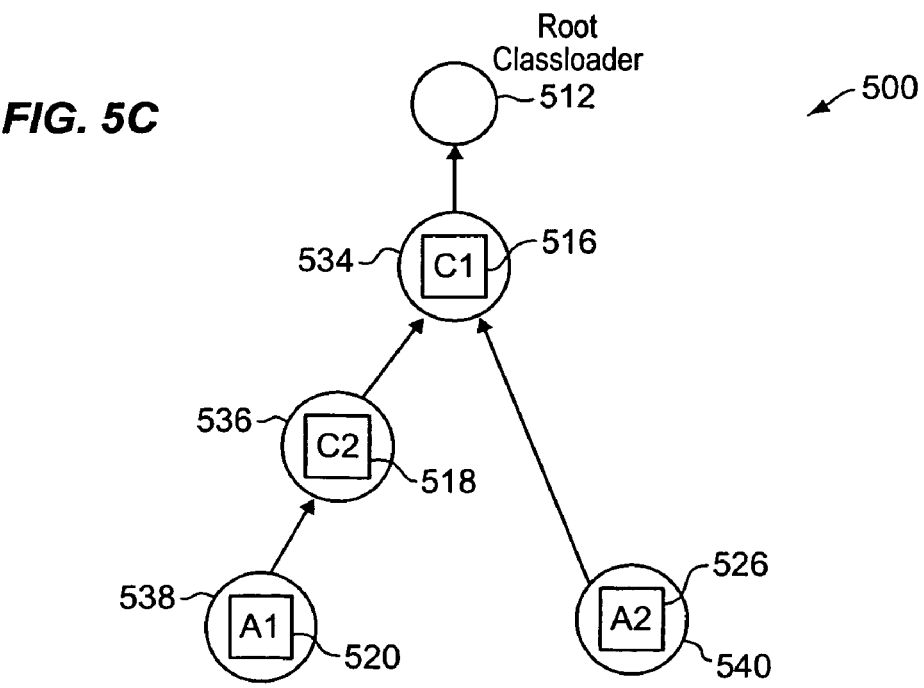

Another solution is to put components C1 and C2 516 and 518 into a hierarchy, such as into separate class loaders 534 and 536, respectively, as illustrated in FIG. 5C. However, although this is a slightly better solution than the one outlined in FIG. 5B, putting component C1 and C2 516-518 into a hierarchy results in component C2 536 being able to see component C1 516 and its classes, while component C1 516 not being able to see component C2 518, also leads to identical class name problems.

Figure 5D:
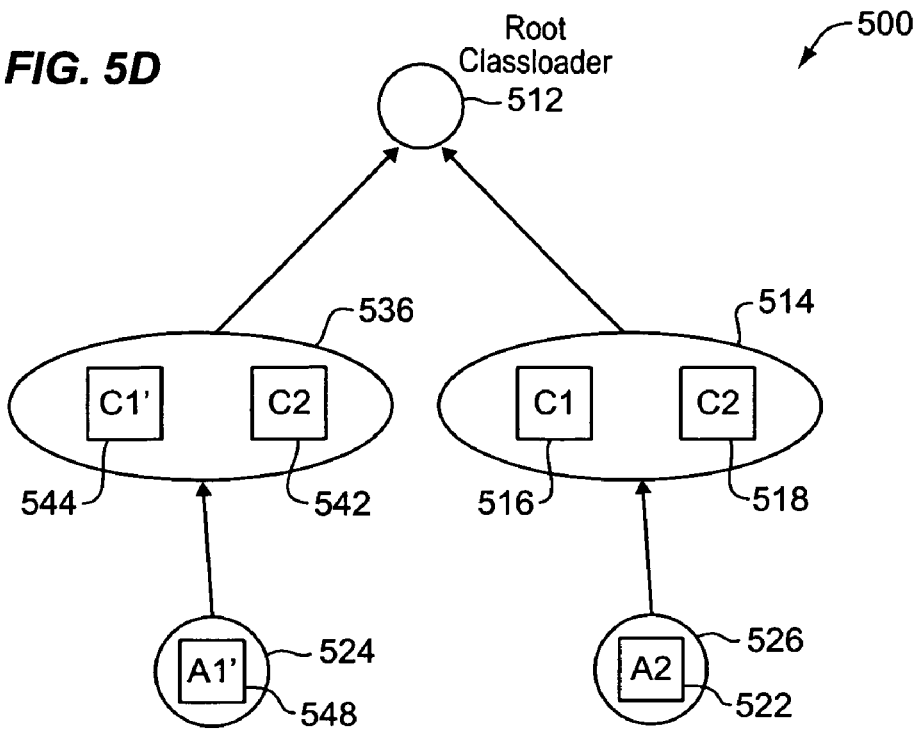

FIG. 5D illustrates updating application A1 520 and component C1 516 from FIG. 5B into new application A1' 548 and new component C1' 544, respectively. This needs to be accomplished without affecting application A2 522, which also depends on component C1 516 but can work with the existing version of component C1 516. However, as illustrated, using the conventional model 500, to accomplish the task of updating application A1 520 and component C1 516 without affecting application A2 522, would require component C2 518 to be duplicated into component C2 542. This solution unnecessarily affects an unrelated component, i.e., component C2 518, which can create several problems and lower efficiency, particularly when dealing with multiple applications and components. Further, this problem is an extension of and in addition to having other drawbacks as described with reference to FIG. 5B.

Figure 5E:
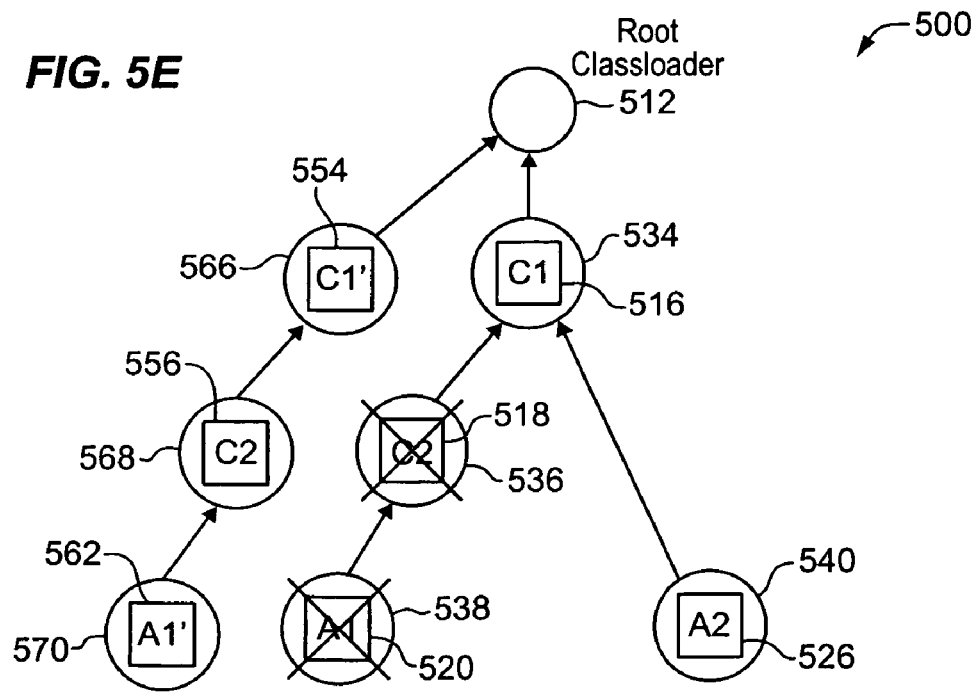

Referring now to FIG. 5E, it provides another hierarchy-based solution for updating Application A1 520 and component C1 516 into new application A1' 562 and new component C1' 554 from FIG. 5C. However, this solution also results in having component C2 518 being redeployed into component C2 556, leading to similar problems as with FIG. 5D, which are in addition to other drawbacks as described with reference to FIG. 5C. Having a single parent class loader model 500 results in these and other complexities that are far more cumbersome than the ones described here, as there are numerous more components associated with SAP's Web AS.

Figure 6A:
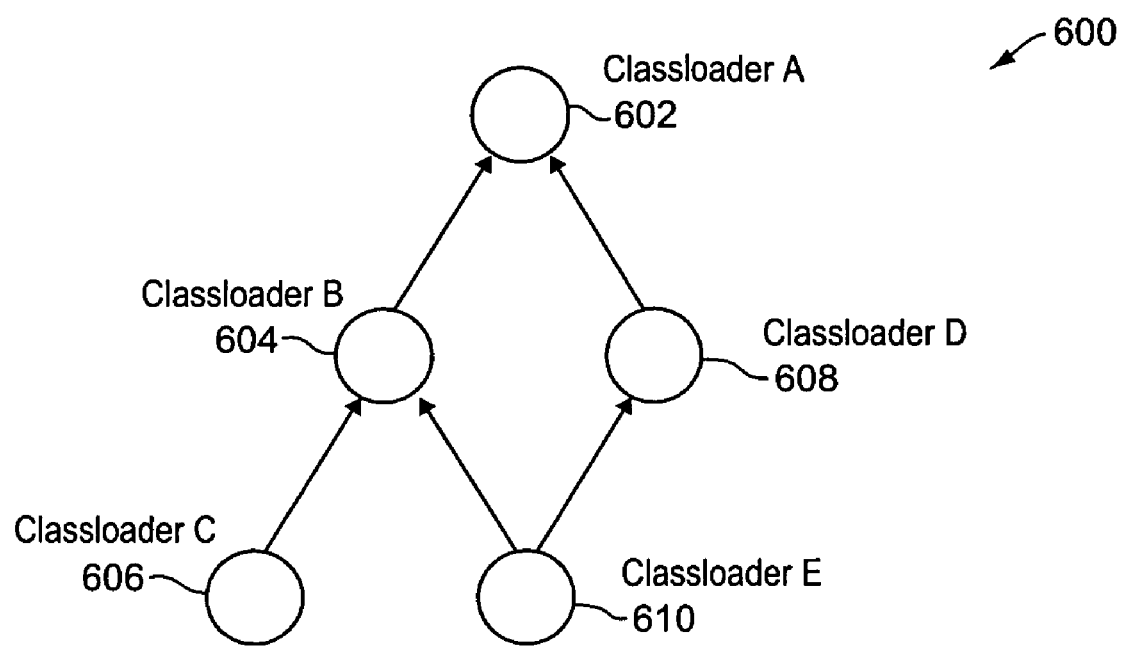
FIG. 6A-6C are block diagrams illustrating an embodiment of a multi-parent class loading model.
Figure 6B:
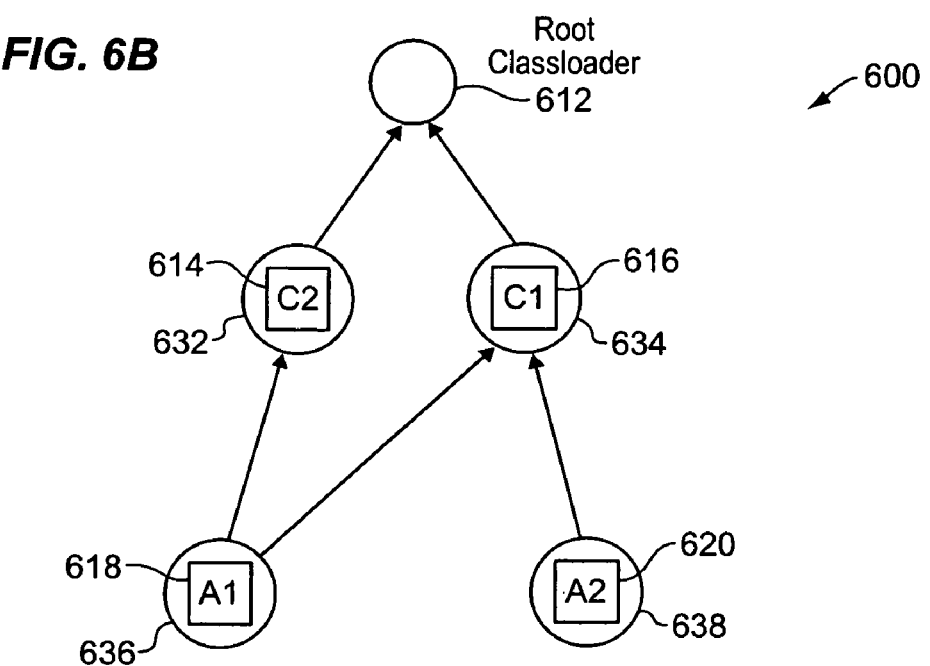
Figure 6C:
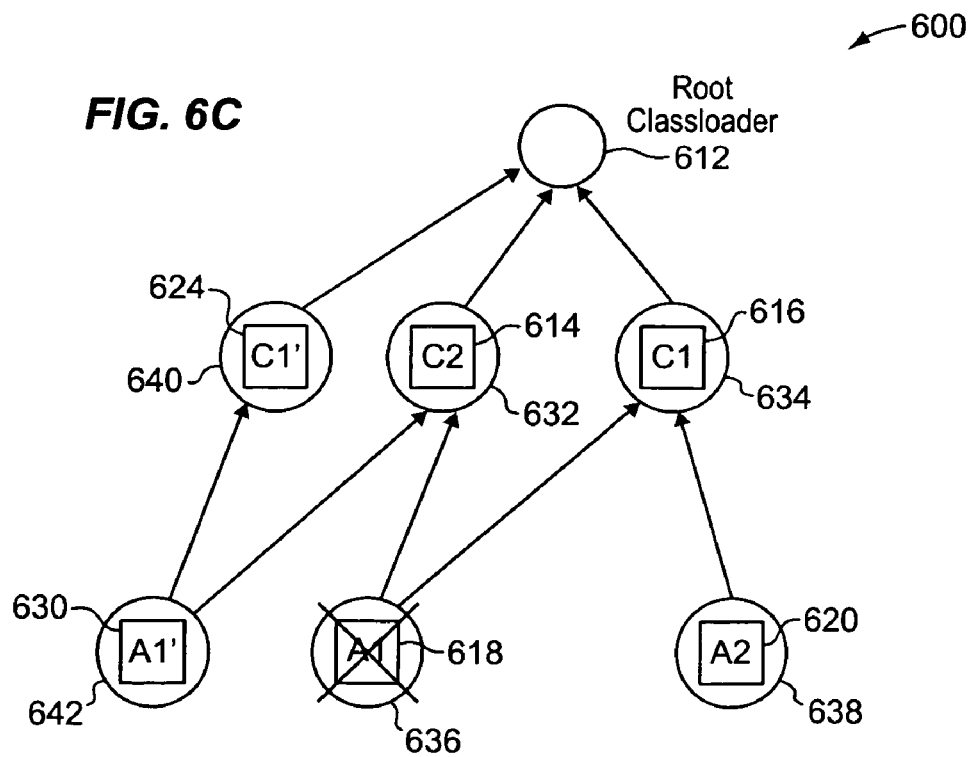

FIG. 6A-6C are block diagrams illustrating an embodiment of a multi-parent class loading model (multi-parent model) 600. The illustrated multi-parent model 600 of FIG. 6A extends a single child-parent relationship (i.e., one child can have exactly one parent as described with reference to the conventional class loading model 500 of FIGS. 5A-5E) into multiple child-parent relationships (e.g., one child can have one to several parents). Having a multi-parent model 600 helps eliminate the need to put two or more independent components into a single class loader. Also, components can be redeployed without having to start/stop other independent components. Furthermore, the visibility problem is resolved by having made the incompatible components not to see each other. An embodiment of a process for using an embodiment of the multi-parent class loading model 600 is illustrated with reference to FIG. 7.

In the illustrated multi-parent model 600, class loaders 602-610 are organized in a directed acyclic graph model, such that each class loader 602-610 can access its parent class loaders up to the top, as indicated by the solid arrows. As illustrated, components loaded by child class loaders 604-610 can see their parent class loaders 602-604, 608 upward. For example, components loaded by class loader E 610 can identify and observe components loaded by class loaders A, B and D 602-604, 608, while components loaded by class loader C 606 can see components loaded by class loaders B and A 604, 602. Examples of using the multi-parent class loading model 600 are described in FIGS. 6B-6C.

FIG. 6B illustrates an embodiment of a multi-parent class loading model 600 includes applications A1 and A2 618 and 620 at class loaders 636 and 638, respectively, and components C1 and C2 616 and 614 at class loaders 634 and 632, respectively, and a root class loader 612. The illustrated embodiment represents a new class loader hierarchy enabled by multi-parent class loading for the requirements set forth in FIGS. 5B and 5C. In the illustrated embodiment, components C1 and C2 616, 614 do not see each other and further, they do not interfere with each other. Also, the class loader 636 of application A1 618 can the see class loaders 634 and 632 of components C1 and C2 616 and 614, respectively. However, class loader 638 of application A2 620 can only see the class loader 634 of component C1 616 as specified in the requirements for this scenario. Stated differently, applications A1 and A2 618 and 620, see only those components upon which they depend, such as components C1, C2 616, 614 for application A1 618, and component C1 616 for application A2 620. Furthermore, the independent components C1 and C2 616, 614 do not see each other.

Referring now to FIG. 6C, application A1 618 and component C1 616 are to be updated as in FIGS. 5D and 5E. The updating of application A1 618 and component C1 616 needs to be performed without affecting application A2 620 and component C2 614. Using the multi-parent class loading model 600, as illustrated in FIG. 6C, application A1 618 can be stopped and removed, as shown being crossed out. Since application A2 620 depends on component C1 616, another instance consisting of the new version of component C1 616 is created and referred to as component C1' 624. Using this technique, the running system is not affected, particularly component C1 616, component C2 614, and application A2 620 since the loading is performed using a new class loader 640 of component C1' 624, which is not visible from other component class loaders 638, 634, 632. Further, the new version of application A1 618, which is application A1' 630, can now be loaded. The class loader 642 for the new application A1' 630 has two parent loaders 640 and 632 of components C1' and C2 624 and 614, respectively.

Although the model 600 provides significant semantic advantages, it can also have performance implications when being implemented and it may not be appropriate for running on large application servers. This is further discussed with reference to FIG. 9.

Figure 7:
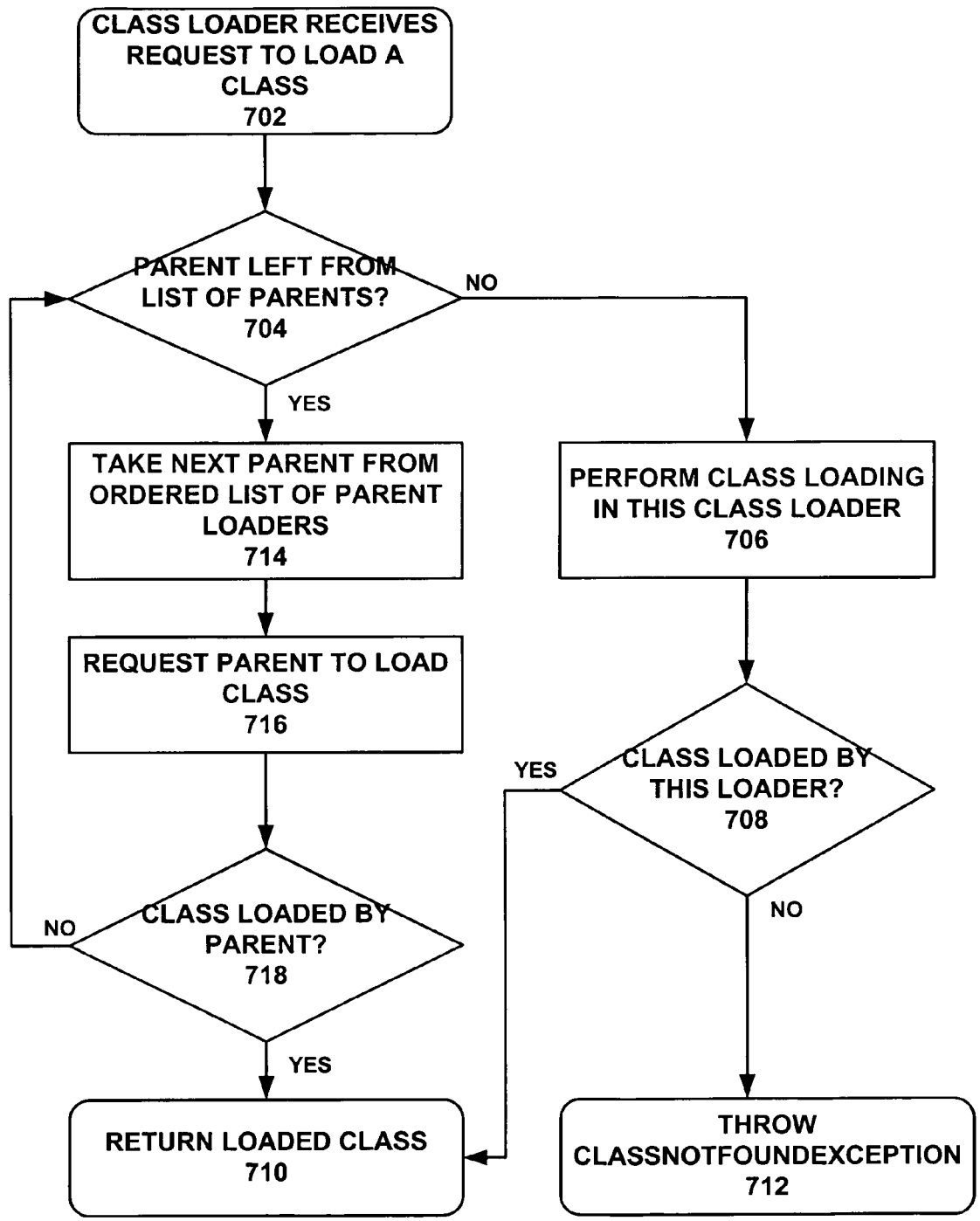
FIG. 7 is a flow diagram illustrating an embodiment of a process for using a multi-parent class loading model.

FIG. 7 is a flow diagram illustrating an embodiment of a process for using a multi-parent class loading model. First, a class loader receives a request to load a class at processing block 702. This request is received at any of the class loaders of the multi-parent class loader tree depending on the component currently executed. The class loader receiving the request may be regarded as the initiating class loader at which the request is received from the Java runtime system or directly through an API. The initiating class loader refers the class loading request to a class loader that loads the class (the defining class loader) which may be identical to the initiating class loader or a direct or indirect parent class loader of the initiating class loader. At decision block 704, a determination is made as to whether there is a parent left from the ordered list of parent class loaders. If not, at processing block 706, class loading is performed by the class loader itself where the request was received (the initiating class loader). At decision block 708, a determination is made as to whether the class was loaded by the class loader. If yes, the loaded class is returned at processing block 710. If not, an exception (e.g., <classnotfoundexception>) is thrown by the class loader at processing block 712.

In one embodiment, if there are parents left from the list of parents, the next parent from the list of parent loaders is taken at processing block 714. The parent is then accessed and requested to load the class at processing block 716. If the parent class loader is a multi parent class loader this starts the process described in FIG. 7 at processing block 702 for the parent class loader. If the parent loader is a class loader provided by the Java runtime system, the process is performed according to the implementation from the VM vendor. After completing the process as described in FIG. 7 or the VM specific process, at decision block 718, a decision is made as to whether the class was loaded by the parent from the list of parents. If yes, the loaded class is returned at processing block 710. If the class is not loaded by the parent, the process continues at decision block 704 with determining whether there is a parent left from the list of parents to load the class.

In contrast to the established java class loader model, where every class loader has exactly one parent class loader, a multi-parent class loader can have multiple parents. This new multi-parent class loading model provides better isolation between the components of an application server, improved stability, reduced resource consumption, and better maintainability.

The multi-parent class loading model is in compliance with the Java Language Specification [James Gosling, et al. 1996-2000: The Java Language Specification Second Edition, http://java.sun.com/docs/books/jls/]. The multi-parent class loader is a well-behaved class loader with respect to the following properties set forth in the language specification: (1) given the same name, a good class loader returns the same class object; and (2) if a class loader L1 delegates loading of a class C to another loader L2, then for any type T that occurs as the direct superclass or a direct superinterface of C, or as the type of a field in C, or as the type of a formal parameter of a method or constructor in C, or as a return type of a method in C, L1 and L2 return the same class object. These two properties are fulfilled by having a fixed parent order and transitivity. The parent order is specified when the class loader is created and is not to be changed afterwards. For transitivity, consider the following class loader hierarchy:

class loader C has a parent class loader B, and class loader B has a parent class loader A. This means that class loader C can also see classes loaded by class loader A.

Figure 8:
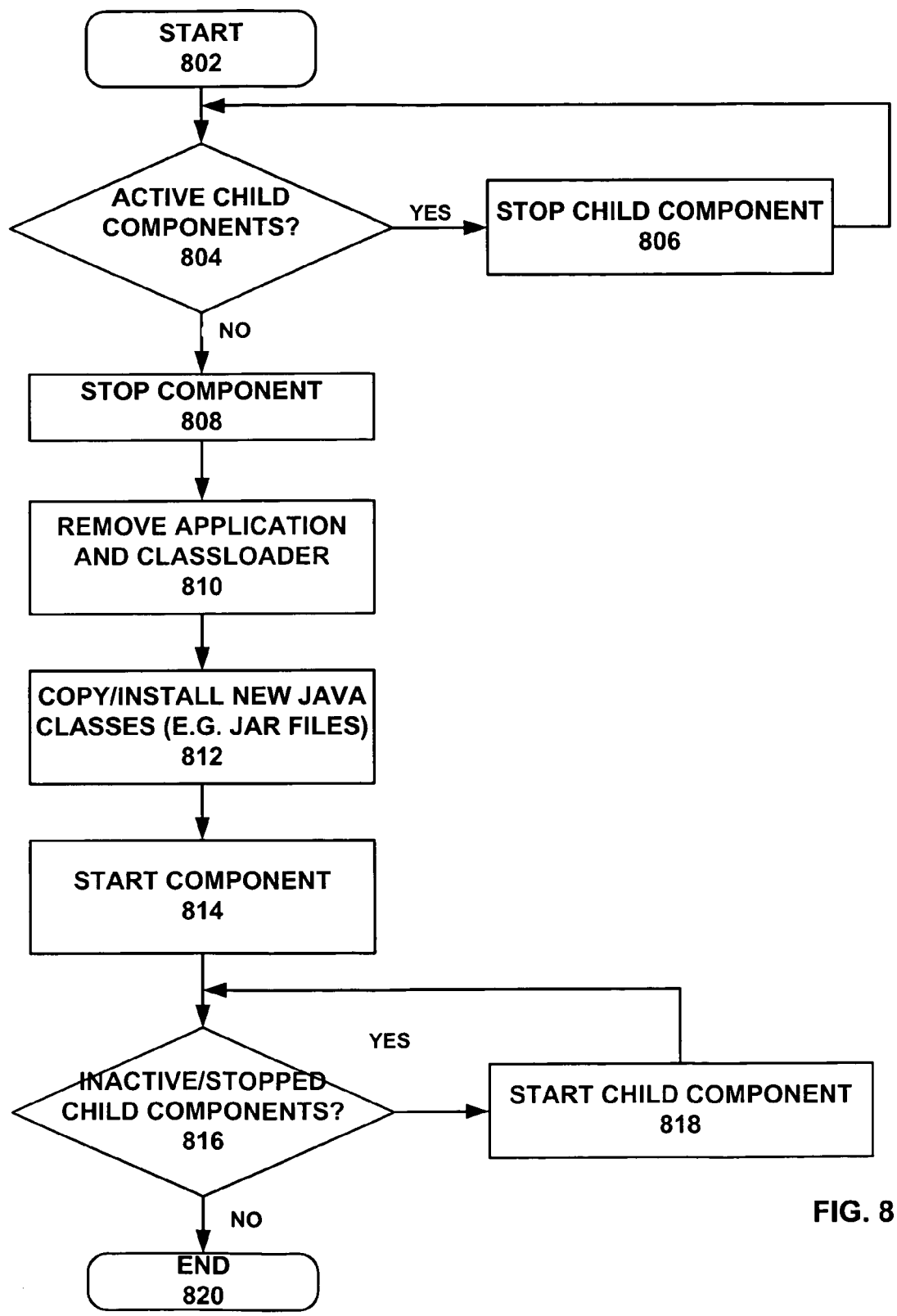
FIG. 8 is a flow diagram illustrating an embodiment of a process for redeployment of components using a multi-parent class loading model.

FIG. 8 is a flow diagram illustrating an embodiment of a process for redeployment of components using a multi-parent class loading model. Generally, deployment refers to deployment of an application or component which has not yet been loaded or executed. The classes comprising the application or component are copied to a place from where a class loader can load them. Typically, a multi-parent class loader is created at the engine and is configured with the following properties: class loader name, list of parent class loaders, list of jar files or classpaths from where to load the java classes. The application or component is then loaded by the newly instantiated class loader. Redeployment, on the other hand, refers to deploying of the application or component that already exists at the application server. Further, redeployment also means that when a component is redeployed, the component's direct and indirect child components are also affected by this.

The process begins 802 with determining whether there are any active child components at decision block 804. If yes, the child components are stopped at processing block 806 (which means that the references to the class loader, classes loaded by the class loader, and objects which are instances of the classes are removed, so the Java runtime system can garbage collect them). Using FIG. 6A, an example of stopped child components would be component at class loaders 604-610 that are stopped from bottom-up until reaching the component (to be redeployed) at class loader 602. If no child components are active, the component itself is stopped at processing block 808.

At processing block 810, the application (to be redeployed) and the corresponding class loader are removed which means that the references to the class loader, classes loaded by the class loader, and objects which are instances of the classes are removed, so the Java runtime can garbage collect them. At processing block 812, new Java classes (e.g., jar files) are copied and installed. At processing block 814, the newly deployed component is started. At decision block 816, a determination is made as to whether there are any inactive or stopped child components. If not, the process ends at termination block 820. If there are inactive and/or stopped child components, such child components are started at processing block 818. The starting of the child components may be recursive. Starting child components means the creation of new class loaders which load the classes that form the software component and initializing the software components.

Figure 9:
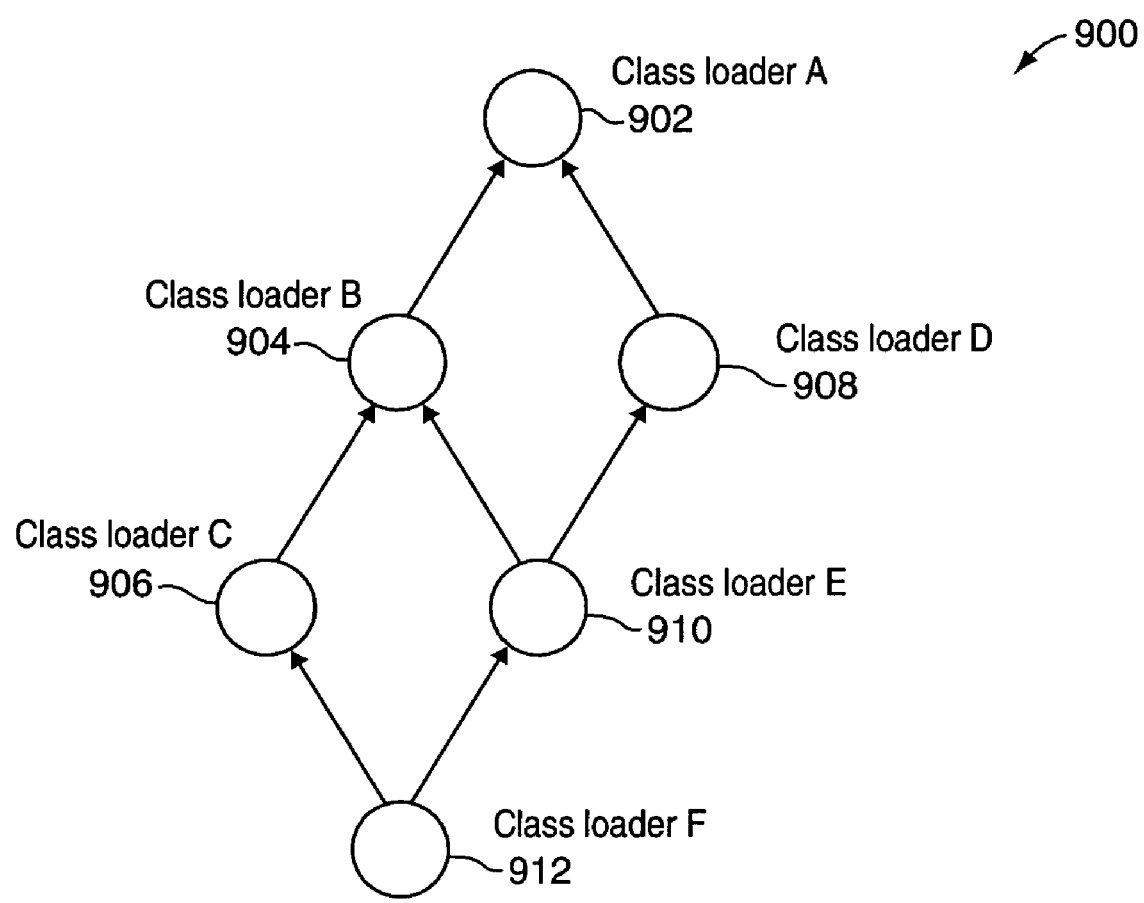
FIG. 9 is a block diagram illustrating an embodiment of a multi-parent class loading model.

FIG. 9 is a block diagram illustrating an embodiment of a multi-parent class loading model 900. In the illustrated example, several class loaders A-F 902-912 are provided. As with model 600 of FIG. 6A, components loaded by children class loaders can see their parent class loaders up to the top, but the parent class loaders cannot see the children class loaders. For example, components loaded by class loader E can see components loaded by class loaders A, B, and D 902, 904, and 908. Similarly, components loaded by class loader C can see components loaded by class loaders A and B 902 and 904.

In this case, each class loader first asks all its parent class loaders (e.g., the entire graph of class loaders above it) before loading the class itself, if none of the parents were able to load the class. Since there can be more than one parent, there can be potentially multiple paths to the root class loader. Referring back to the previous example, starting with class loader E 910, class loader A 902 can be reached both via class loader B 904 and class loader D 908. In case of a large application server and a naive implementation of the multi-parent class loader, this could lead to a situation where a single class loader is queried several hundred times to load a class even though it is already known that it cannot load the class.

By way of an example, assuming a loadclass (e.g., "MyClass") is called on class loader F 912, and further assuming class loader F 912 can itself load MyClass, the order in which class loaders are queried for the class is as follows: (1) class loaders A, B, and C 902, 904, and 906; (2) class loaders A, and B 902, and 904; and (3) class loaders A, D, E, and F 902, 908, 910, and 912. For example, this solution necessitates queering class loader A 902 three times and class loader B 904 twice, even knowing that neither class loader A 902 nor class loader B 904 could load MyClass. This may be the case even when the initiating class loader, e.g., class loader C 906, is regarded as the defining class loader (the class loader which loads the class), in which case searching the entire structure above it (e.g., class loaders A, B 902, 904) adds to the cost and the application server startup time. It is contemplated that this is merely an example and that this matter could be further complicated in a J2EE engine in which more than 8000 class loaders may be queried before a class is loaded.

In one embodiment, since the tree of parent class loaders is known at the time a class loader 902-912 is created, an array of class loaders is established. Assuming the creation of class loader F 912 the order in which class loaders A-E 902-910 are queried using the algorithm shown in FIG. 7 is known and does not change during the lifetime of the class loader F 912. An array of class loaders is created, where the order of the array matches the order of class loaders queried using the algorithm shown in FIG. 7. Any additional occurrences of the same class loader are removed from the array, so every parent class loader is queried only once. The order is determined by the point in time when a class loader attempts to load a class by itself, e.g., after all its parent class loaders have been queried and were unable to load the class. The new array simulates the backtracking of the class loaders 902-910 using the determined path, but it has each class loader 902-910 queried merely once by cutting off any of those class loaders that were previously queried. For example, the following paths (1) class loaders A, B, and C 902, 904, and 906; (2) class loaders A, and B 902, and 904; and (3) class loaders A, D, E, and F 902, 908, 910, and 912 are reduced to one path of class loaders A, B, C, D, E, and F 902, 904, 906, 908, 910, and 912. The new path eliminates multiple visits to class loaders previously queried (e.g., class loaders A, B 902, 904) by having those class loaders queried merely once.

Typically, the set of classes to be loaded for an application is fixed, which refers to having the advanced knowledge of which classes are to be loaded by which of the class loaders 902-912. Using this information and to avoid making unnecessary queries with class loaders 902-912 that are known not to be able to load a particular class, in one embodiment, those class loaders 902-912 that cannot load the particular class (e.g., MyClass) are skipped. In one embodiment, this information can be further used to not only skip the class loaders 902-912 that cannot load a particular class, but also to know the class loaders 902-912 that can load that particular class. Stated differently, this information is then used to extend the process by directly selecting those class loaders 902-912 that are known to load a particular class when that particular class is to be loaded. This information is known and kept at start up and is referred to once or when necessitated.

Furthermore, in one embodiment, throwing exceptions (e.g., <ClassNotFoundException>) when a class loader, such as class loader A 902, cannot load a class is eliminated. Throwing exceptions is considered a very expensive operation in the Java programming language. Stated differently, a less costly and more efficient class loading is provided by eliminating the need for throwing an exception each time a class loader 902-912 fails to load a class. For example, if class loader A 902 has been called from class loader B 904 and fails to load a particular class, it may no longer throw the usual exception, but instead, call a return (e.g., <return null>). It is to be noted that this change is internal to the algorithm (or its simulation using the array). In other words, the API contract to the Java virtual machine and to applications is not changed, and so <ClassNotFoundExceptions> are still thrown when interacting with user code or the Java virtual machine.

Figure 10A:
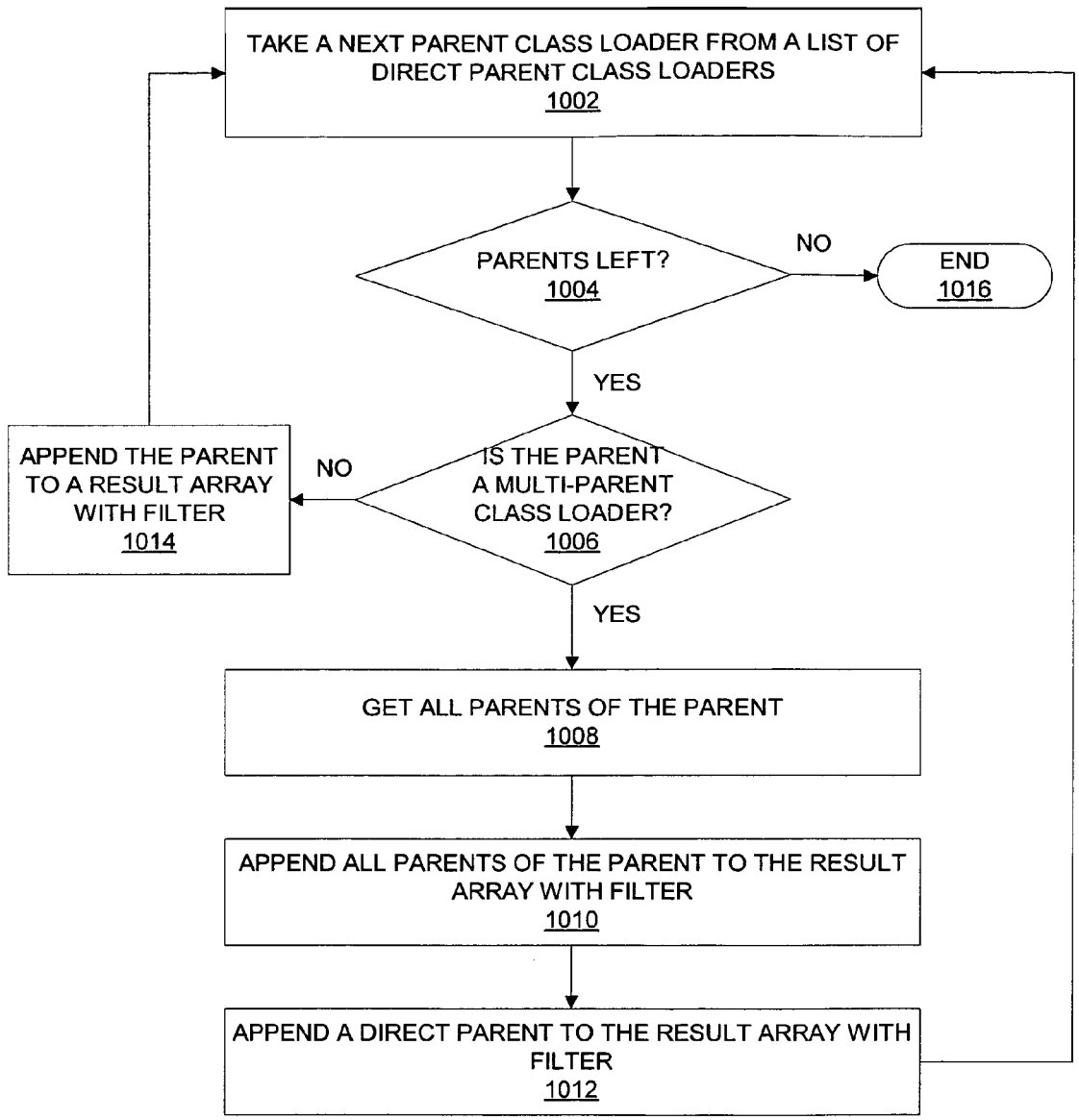
FIG. 10A is a flow diagram illustrating an embodiment of a process for building a data structure.

FIG. 10A is a flow diagram illustrating an embodiment of a process for building a data structure. In one embodiment, an array of parent class loaders is created from the transitive hull of parent class loaders where each class loader only occurs once. The order of the array is determined by when a class loader has queried all its parent class loaders and can then try to load the class by itself. The query algorithm shown in FIG. 10C operating on the array can then directly query a particular class loader to attempt to load the class locally without having to query all parent class loaders as this has already been done before, because the parent class loaders are previous elements in the array.

Considering FIG. 6A, the parent class loader array for class loader E 610 contains the following parent class loaders in the order class loader A 602, class loader B 604, and class loader D 608. Querying each parent class loader in the array to attempt to load the class locally exactly matches the backtracking algorithm without the branches, which already have been queried without prior success.

The process in FIG. 10A starts with the array of direct parents which was given to the class loader when it was created. The result is an array containing all direct and indirect parents in the order described with reference to FIG. 9. The process terminates when all direct parent class loaders have been processed. The next parent is taken from the array at processing block 1002, and if there are no more parents at decision point 1004, the process terminates at block 1016. If there are parents left, the process continues with decision block 1006 where a determination is made as to whether the class loader is multi-parent class loader. If the parent class loader is a class loader provided by the JVM or not a multi-parent class loader, it is then added to the output array at block 1014 using the process described in with reference to FIG. 10B, and the process continues at processing block 1002.

If the class loader is a multi-parent class loader, it retrieves the parents of the given parent at processing block 1008 (i.e., all transitively reachable parents from the parent class loader have been computed using this process when the parent class loader has been created before). The parents of the parent loader are then added to the result array at processing block 1010 using the process described with reference to FIG. 10B. Then, the direct parent is added to the output array at processing block 1012 using the process described with reference to FIG. 10B, and the process continues at processing block 1002.

Figure 10B:
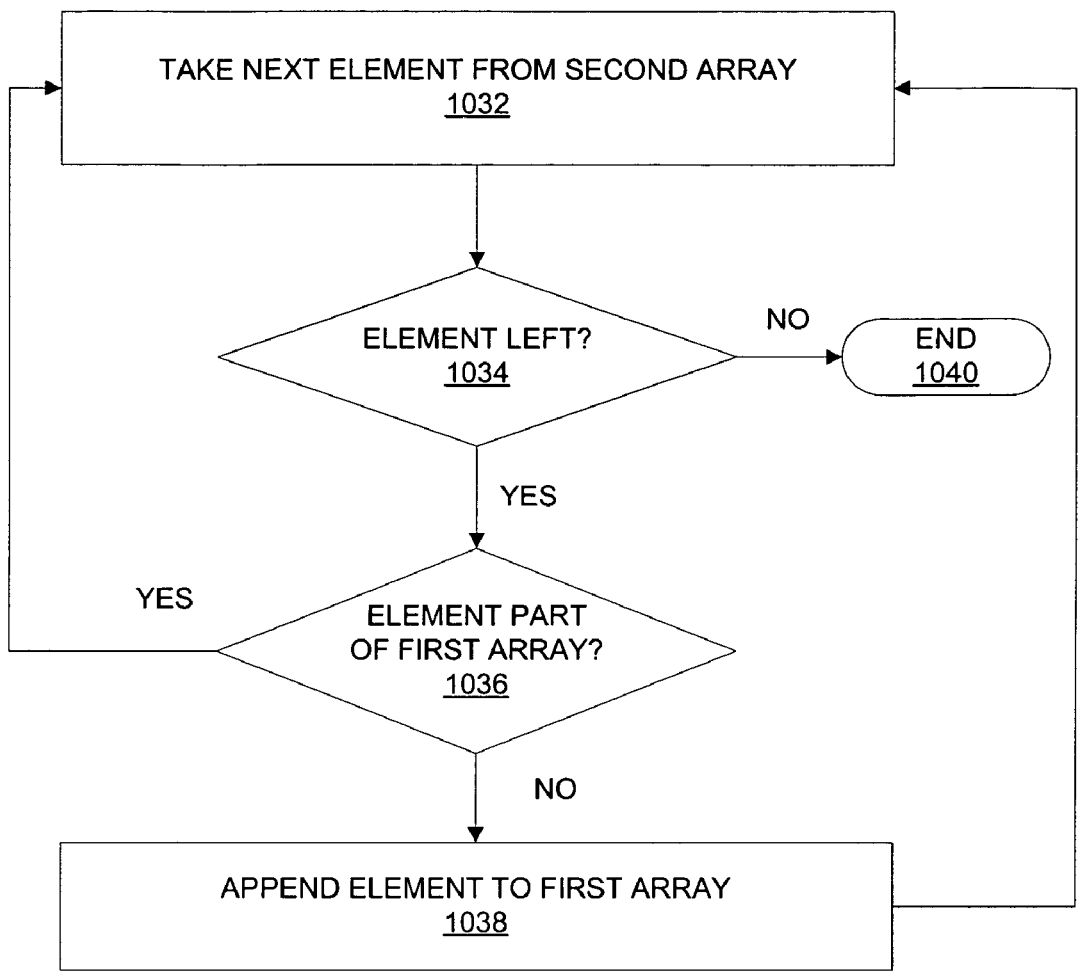
FIG. 10B is a flow diagram illustrating an embodiment of a process for appending a second array to an existing first array.

FIG. 10B illustrates an embodiment of a process for appending a second array to an existing first array. Those elements, which do not already exist in the first array, are to be appended to the first array. The next element is taken from the second array at processing block 1032. At decision block 1034, a determination is made as to whether there are any elements left in the second array. If not, the process terminates at block 1040. If yes, a test is conducted as to whether the element is already part of the first array at decision block 1036. If yes, nothing is done and the process resumes at processing block 1032. If the element is not already part of the first array it is appended to the first array at processing block 1038.

Figure 10C:
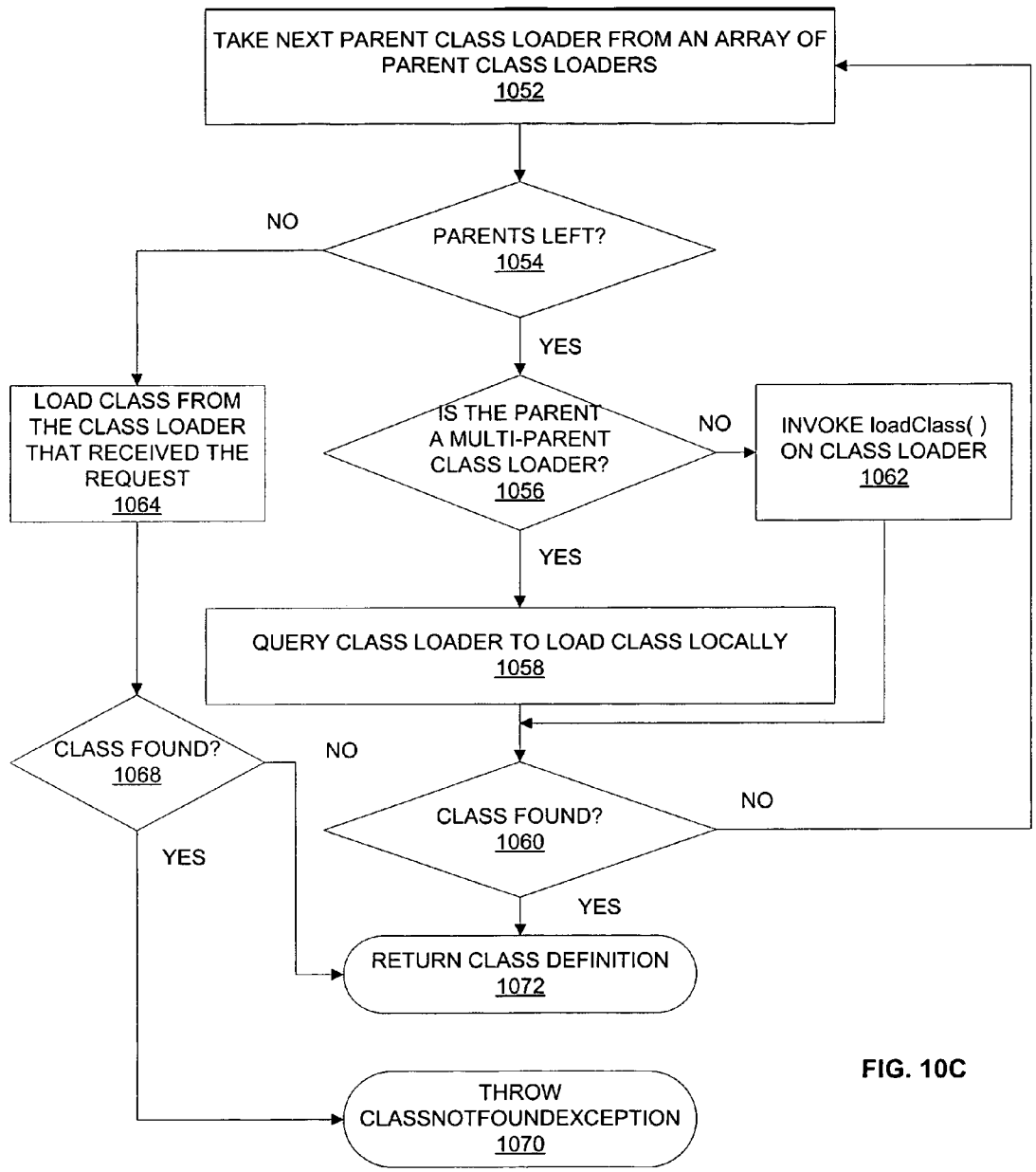
FIG. 10C is a flow diagram illustrating an embodiment of a process for using a multi-parent class loading model based on the array built using the processes described in FIGS. 10A-10B

FIG. 10C illustrates an embodiment of a process for using a multi-parent class loading model based on the array built using the processes described in FIGS. 10A and 10B. The process for loading a class now iterates over the array of class loaders built using the process described in FIG. 10A by taking the next parent class loader from the array of parent class loaders at processing block 1052. As long as the end of the array is not reached at decision block 1054, the next class loader is taken from the array and a determination is made as to whether the class loader is a multi-parent class loader at decision block 1056. If the class loader is not a multi-parent class loader, such as a class loader provided by the JVM implementation, its normal loadClass( ) method is called at processing block 1062 which triggers the JVM-provided class loading implementation outside of the J2EE Engine. At decision block 1060, if the JVM-provided class loader loaded the class, the process terminates at block 1072 by returning the class definition; otherwise, the process continues at processing block 1052.

Referring back to decision block 1056, if the selected class loader is a multi-parent class loader, the process requests the class loader to load the class locally without querying its parents at processing block 1058. At decision block 1060, if the class was found and the selected parent class loader was capable of loading the class locally, the class definition is returned at block 1072 resulting in termination of the process; otherwise, the process continues at processing block 1052. Referring back to decision block 1054, if all the class loaders from the array of class loaders were queried and none were able to load the class, the initiating class loader that received the original request to load the class attempts to load the class by itself at processing block 1064. At decision block 1068, if the class definition could be loaded, it is returned at block 1072; otherwise, an exception is thrown, such a <ClassNotFoundException> exception, at block 1070.

These techniques provide a significant enhancement in class loading, eliminating query branches of class loaders which have been queried before in the same process and are known not to be able to load the class. Further improvements in the algorithm are possible by taking into consideration the following observations. (1) Most of the class load requests directed to a particular class loader can be fulfilled by the class loader itself (2) The set of classes which can be loaded by a particular class loader in the J2EE Engine is known at startup time of the Engine for most of the class loaders and does not change.

Figure 11:
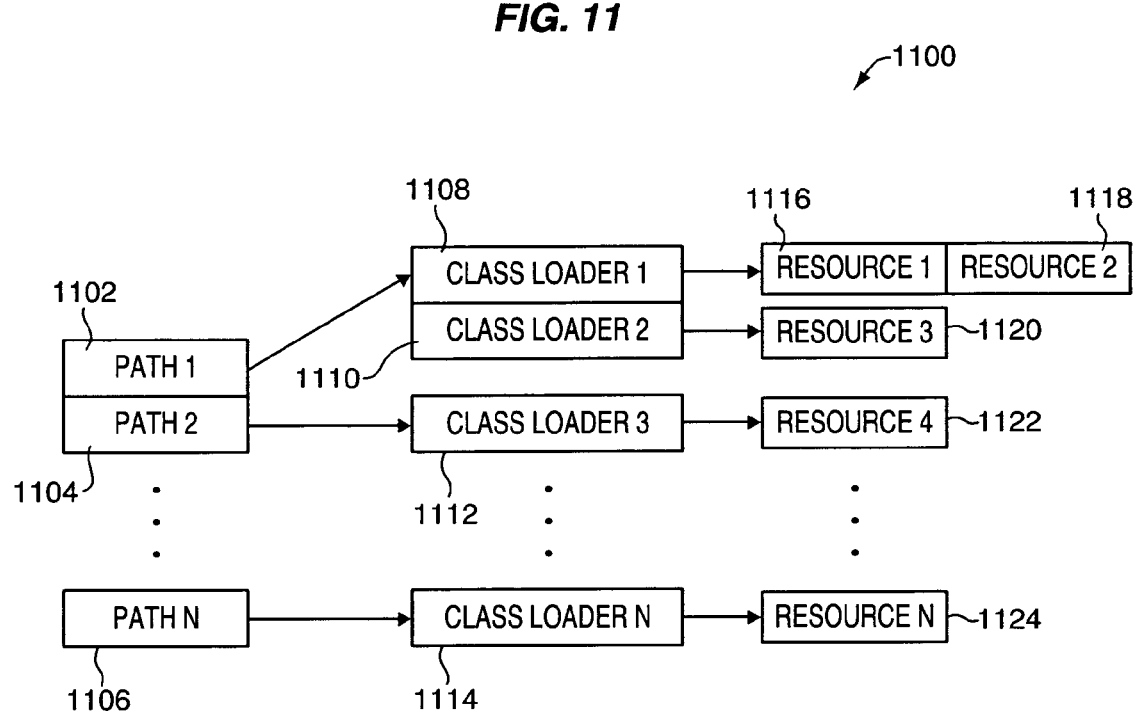
FIG. 11 is a block diagram illustrating an embodiment of a global data structure having a map of resources.

FIG. 11 is a block diagram illustrating an embodiment of a global data structure 1100 having a map of resources. The global data structure 1100 is built using a particular algorithm and is used to efficiently find a class loader given the fully qualified class name of the requested class. For storage efficiency, just the path name 1102-1106 of the fully qualified class name is considered. All path names 1102-1106 are stored in a hashed map structure, so given the path name of a fully qualified class name, a lookup of the list of associated class loaders, such as class loader 1 1108, class loader 2 1110, class loader 3 1112, and class loader 4 1114, is very efficient. Associated with each class loader 1108-1114 is a list of resources 1116-1124, which contain information for the class loader to use for loading the class (e.g. which of the jar files contains the class).

This approach can be slightly inaccurate because there can be (1) classes with identical fully qualified names in different resources loaded by different class loaders; and (2) classes with identical path names loaded by different class loaders. However, the process described in FIG. 12 is capable of dealing with this inaccuracy and the overall performance impact is negligible.

Figure 12:
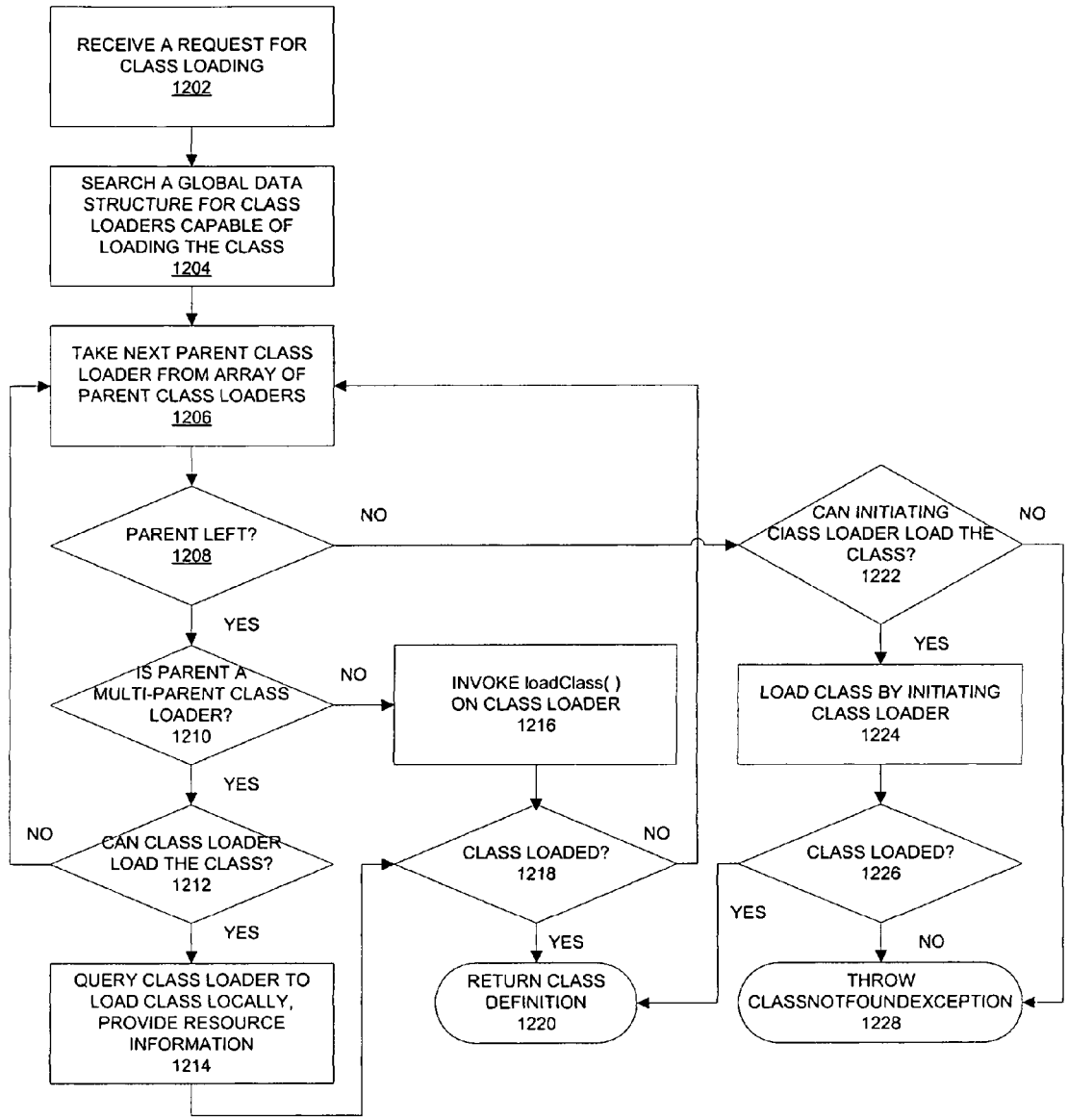
FIG. 12 is a flow diagram illustrating an embodiment of a process for class loading using the data structure from FIGS. 10A-10C and 11.

Based on the data structure shown in FIG. 11, the process introduced in FIG. 10C is revised in FIG. 12. The embodiment of the process illustrated in FIG. 12 takes into consideration that such a data structure exists. A request for class loading is received at processing block 1202. After receiving the request to load a class, the global data structure (as shown in FIG. 11) is queried for class loader candidates that may be able to load the class at processing block 1204. The array of the parent class loaders is searched sequentially starting at processing block 1206, and a determination is made as to whether any parents are left at decision point 1208. If there are class loaders left, a determination is made as to whether the selected class loader is a multi-parent class loader at decision block 1210.

If the selected class loader is not a multi-parent class loader at decision point 1210, the loadClass( ) method is invoked on the class loader at processing block 1216. If the class loader is a multi-parent class loader, a determination is made at decision block 1212 at to whether the selected class loader is a candidate capable of loading the class based on the information retrieved from the global data structure. If the class loader is not a candidate capable of loading the class, the process continues with the next class loader from the array at block 1206. If the class loader is a proper candidate, it is queried to load the class at processing block 1214. At decision block 1218 a determination is made at to whether the class is loaded. If yes, the process is terminated and the class definition return is made at block 1220; otherwise, the next class loader is taken from the array of class loaders at processing block 1206. Referring back to decision block 1210, if the class loader is not a multi-parent class loader but a JVM provided class loader, the loadClass( ) method is called on the class loader at processing block 1216. A determination is made as to whether the class could be loaded at decision point 1218. If the class could be loaded, the class definition is returned at processing block 1220; otherwise, the process continues at processing block 1206 with the next parent from the array.

Referring back to decision block 1208, if the end of the array has been reached, another determination is made as to whether the initiating class loader is a candidate to load the class at decision block 1222. If the class is not considered a candidate, a <ClassNotFoundException> exception is thrown at block 1228; otherwise, the initiating class loader is queried for the class at processing block 1224. At decision block 1226, if the class has been found, it is returned at block 1220; otherwise, a <ClassNotFoundException> is thrown at block 1228.

Figure 13:
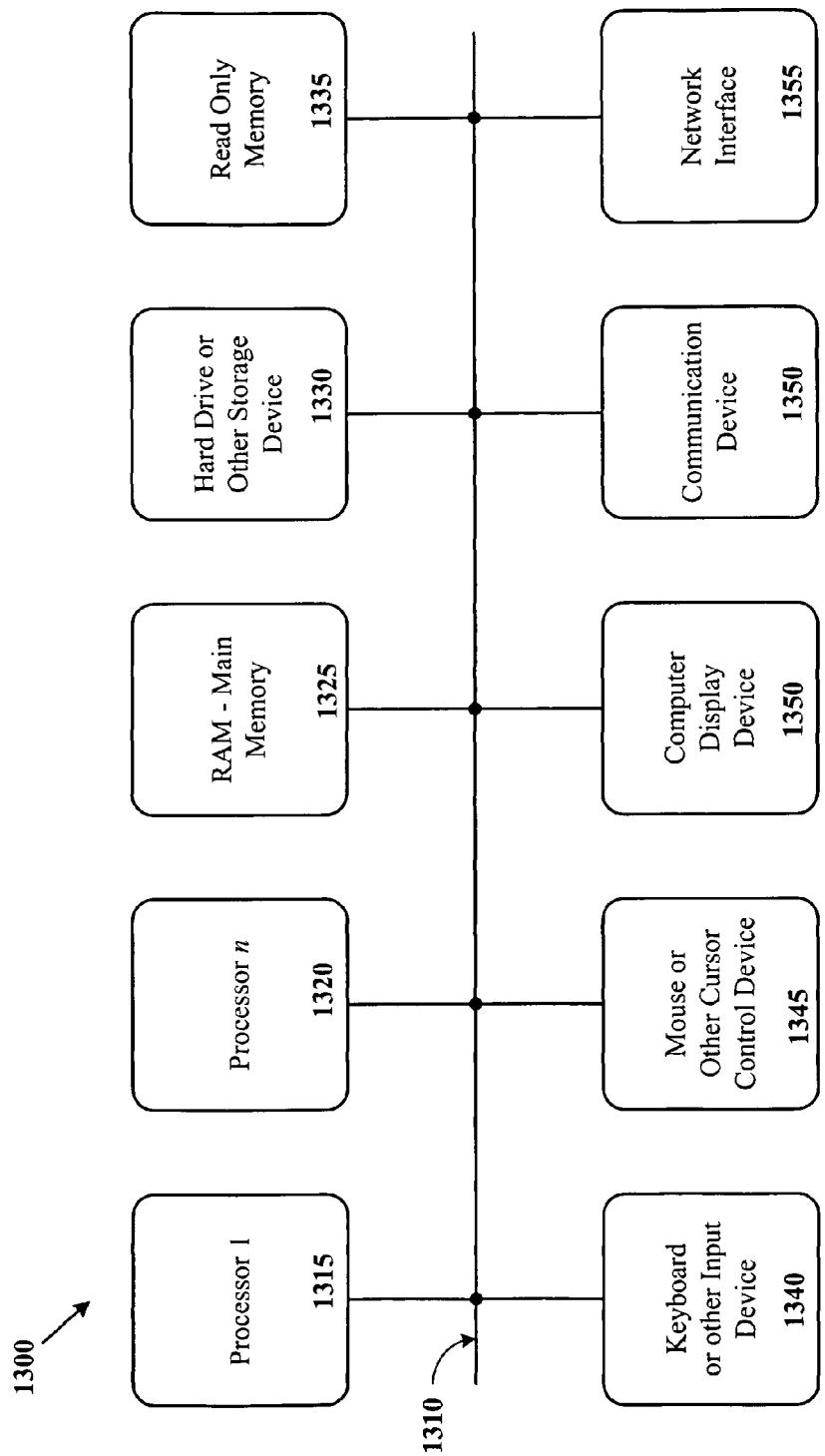
FIG. 13 is an exemplary computer system used in implementing an embodiment of the present invention.

FIG. 13 is an exemplary computer system 1300 used in implementing an embodiment of the present invention. In this illustration, a system 1300 comprises a bus 1310 or other means for communicating data. The system 1300 includes one or more processors, illustrated as shown as processor 1 1315 through processor n 1320 to process information. The system 1300 further comprises a random access memory (RAM) or other dynamic storage as a main memory 1325 to store information and instructions to be executed by the processor 1315 through 1320. The RAM or other main memory 1325 also may be used for storing temporary variables or other intermediate information during execution of instructions by the processors 1315 through 1320.

A hard drive or other storage device 1330 may be used by the system 1300 for storing information and instructions. The storage device 1330 may include a magnetic disk or optical disc and its corresponding drive, flash memory or other non-volatile memory, or other memory device. Such elements may be combined together or may be separate components. The system 1300 may include a read only memory (ROM) 1335 or other static storage device for storing static information and instructions for the processors 1315 through 1320.

A keyboard or other input device 1340 may be coupled to the bus 1310 for communicating information or command selections to the processors 1315 through 1320. The input device 1340 may include a keyboard, a keypad, a touch-screen and stylus, a voice-activated system, or other input device, or combinations of such devices. The computer may further include a mouse or other cursor control device 1345, which may be a mouse, a trackball, or cursor direction keys to communicate direction information and command selections to the processors and to control cursor movement on a display device. The system 1300 may include a computer display device 1350, such as a cathode ray tube (CRT), liquid crystal display (LCD), or other display technology, to display information to a user. In some environments, the display device may be a touch-screen that is also utilized as at least a part of an input device. In some environments, the computer display device 1350 may be or may include an auditory device, such as a speaker for providing auditory information.

A communication device 1350 may also be coupled to the bus 1310. The communication device 1350 may include a modem, a transceiver, a wireless modem, or other interface device. The system 1300 may be linked to a network or to other device using via an interface 1355, which may include links to the Internet, a local area network, or another environment. The system 1300 may comprise a server that connects to multiple devices. In one embodiment the system 1300 comprises a Java® compatible server that is connected to user devices and to external resources.

While the machine-readable medium 1330 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1300 and that causes the machine to perform any one or more of the methodologies of the present invention. The term "machine-readable medium" shall accordingly be taken to include, but not be limited to, solid-state memories, optical and magnetic media, and carrier wave signals.

Furthermore, it is appreciated that a lesser or more equipped computer system than the example described above may be desirable for certain implementations. Therefore, the configuration of system 1300 may vary from implementation to implementation depending upon numerous factors, such as price constraints, performance requirements, technological improvements, and/or other circumstances.

It should be noted that, while the embodiments described herein may be performed under the control of a programmed processor, such as processors 1315 through 1320, in alternative embodiments, the embodiments may be fully or partially implemented by any programmable or hardcoded logic, such as field programmable gate arrays (FPGAs), transistor transistor logic (TTL), or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
   receiving at an initiating class loader a request for loading a class for a first software application, the class being associated with the first software application and a second software application, the first and second software applications running on an application server of a computer system;
   narrowing class loaders associated with the first and second software applications to an array of candidate class loaders capable of loading the class such that when the class is loaded for the first software application by one of the array of candidate class loaders, execution of the second software application, if loaded, remains uninterrupted, the array of candidate class loaders capable of including single-parent class loaders and multi-parent class loaders, the multi-parent class loaders being class loaders that each have multiple direct parents, the single-parent class loaders being class loaders that each have a single direct parent, the narrowing including:
      identifying an ancestor class loader of the initiating class loader as a parent of a single-parent class loader or a multi-parent class loader;
      in response to the identifying, ascertaining that the ancestor class loader has not been added to the array;
      in response to the ascertaining, detecting that the ancestor class loader is capable of loading the class; and
      in response to the detecting, adding the class loader to the array;
   selecting a first candidate class loader from the array of candidate class loaders to load the class;
   determining that the first candidate class loader is a multi-parent class loader; and
   in response to the determining, instructing the first candidate class loader to load the class for the first software application locally without querying a parent of the first candidate class loader.

2. The method of claim 1, further comprising:
   selecting a second candidate class loader from the array of candidate class loaders to load the class, if the first candidate class loader fails in loading the class;
   discovering the second candidate class loader is a multi-parent class loader; and
   in response to the discovering, instructing the second candidate class loader to load the class for the first software application locally without querying a parent of the second candidate class loader.

3. A system comprising:
   a computer system having an application server, the application server to;
   receive at an initiating class loader a request for loading a class for a first software application, the class being associated with the first software application and a second software application, the first and second software applications running on the application server;
   narrow class loaders associated with the first and second software application to an array of candidate class loaders capable of loading the class such that when the class is loaded for the first software application by one of the array of candidate class loaders, execution of the second software application, if loaded, remains uninterrupted, the array of candidate class loaders capable of including single-parent class loaders and multi-parent class loaders, the multi-parent class loaders being class loaders that each have multiple direct parents, the single-parent class loaders being class loaders that each have a single direct parent, the application server to narrow the class loaders by performing operations including:
      identifying an ancestor class loader of the initiating class loader as a parent of a single-parent class loader or a multi-parent class loader;
      in response identifying, ascertaining that the ancestor class loader has not been added to the array;
      in response to the ascertaining, detecting that the ancestor class loader is capable of loading the class; and
      in response to the detecting, adding the class loader to the array;
   select a first candidate class loader from the array of candidate class loaders to load the class;
   determine the first candidate class loader is a multi-parent class loader; and
   in response to the determining, instruct the first candidate class loader to load the class for the first software application locally via the first candidate class loader without querying a parent of the first candidate class loader.

4. The system of claim 3, wherein the application server is further to:
   select a second candidate class loader from the array of candidate class loaders to load the class, if the first candidate class loader fails in loading the class;
   discover the second candidate class loader is a multi-parent class loader; and
   in response to the discovering, instruct the second candidate class loader to load the class for the first software application locally without querying a parent of the second candidate class loader.

5. A machine-readable storage medium comprising instructions which, when executed, cause a machine to perform a method comprising:
- receiving at an initiating class loader a request for loading a class for a first software application, the class being associated with the first software application and a second software application, the first and second software applications running on the application server;
- narrowing class loaders associated with the first and second software application to an array of candidate class loaders capable of loading the class such that when the class is loaded for the first software application by one of the array of candidate class loaders, execution of the second software application, if loaded, remains uninterrupted, the array of candidate class loaders capable of including single-parent class loaders and multi-parent class loaders, the multi-parent class loaders being class loaders that each have multiple direct parents, the single-parent class loaders being class loaders that each have a single direct parent, the narrowing including:
  - identifying an ancestor class loader of the initiating class loader as a parent of a single-parent class loader or a multi-parent class loader;
  - in response to the identifying, ascertaining that the ancestor class loader has not been added to the array:
  - in response to the ascertaining, detecting ancestor class loader is capable of loading the class; and
  - in response to the detecting, adding the class loader to the array;
- selecting a first candidate class loader from the array of candidate class loaders to load the class;
- determining the first candidate class loader is a multi-parent class loader; and
- in response to the determining, instructing the first candidate class loader to load the class for the first software application locally without querying a parent of the first candidate class loader.

6. The machine-readable storage medium of claim 5, the method further comprising:
- selecting a second candidate class loader from the array of candidate class loaders to load the class, if the first candidate class loader fails in loading the class;
- discovering the second candidate class loader is a multi-parent class loader; and
- in response to the discovering, instructing the second candidate class loader to load the class for the first software application without interrupting the second software application.

7. The method of claim 1, wherein:
the first candidate class loader is a direct parent of the initiating class loader.

8. The method of claim 1, wherein:
the first candidate class loader is an indirect parent of the initiating class loader.

9. The method of claim 1, wherein the narrowing of the class loaders includes determining a mapping in a global data structure between each of the candidate class loaders and the class.

10. The method of claim 1, farther comprising:
- recognizing the first candidate class loader as a single-parent class loader; and
- in response to the recognizing, instructing the first candidate class loader to load the class using a standard loading mechanism, the standard loading mechanism allowing the first candidate class loader to query a parent of the first candidate class loader.

11. The method of claim 1, wherein the order of the array of the candidate class loaders simulates a backtracking of the candidate class loaders over a path based on a hierarchical relationship between the candidate class loaders.

* * * * *